United States Patent [19]

Inoue

[11] 4,101,405
[45] Jul. 18, 1978

[54] SHAPING APPARATUS

[75] Inventor: Kiyoshi Inoue, Tokyo, Japan

[73] Assignee: Inoue-Japax Research (IJR) Inc., Yokohama, Japan

[21] Appl. No.: 743,519

[22] Filed: Nov. 19, 1976

Related U.S. Application Data

[62] Division of Ser. No. 228,155, Feb. 22, 1972, abandoned.

[30] Foreign Application Priority Data

| Feb. 19, 1971 | [JP] | Japan | 46-8312 |
| Feb. 22, 1971 | [JP] | Japan | 46-8305 |
| Feb. 22, 1971 | [JP] | Japan | 46-8306 |
| Mar. 26, 1971 | [JP] | Japan | 46-18265 |
| May 21, 1971 | [JP] | Japan | 46-34536 |
| May 28, 1971 | [JP] | Japan | 46-36270 |

[51] Int. Cl.² .......................... B23P 1/02; B23P 1/12; B24B 17/00; B23D 5/0 4
[52] U.S. Cl. .................. 204/224 M; 204/129.2; 204/129.6; 204/129.7; 51/100 R; 51/415; 90/24.3
[58] Field of Search ........... 204/129.2, 224 R, 224 M, 204/129.6, 129.7; 51/165.71, 413, 34 A, 100 R, 127, 415; 90/24.3

[56] References Cited

U.S. PATENT DOCUMENTS

| 2,696,066 | 12/1954 | Roehm | 51/34 A X |
| 3,601,005 | 8/1971 | McKusick | 51/100 R X |
| 3,650,922 | 3/1972 | Augustin et al. | 204/129.2 |
| 3,713,254 | 1/1973 | Williams et al. | 51/34 A |
| 3,720,804 | 3/1973 | Kriz | 51/100 R |

FOREIGN PATENT DOCUMENTS

| 4,625,677 | 8/1967 | Japan | 204/129.2 |

Primary Examiner—John H. Mack
Assistant Examiner—D. R. Valentine
Attorney, Agent, or Firm—Karl F. Ross

[57] ABSTRACT

A body, e.g. a die or tool for use in electrical machining, is shaped by milling and/or electrical methods using a tool head oriented at a perpendicular to the contour to be shaped by reason of input signals to the several servomotors or controls of the tool head and/or sensor head. The latter is displaceable with at least three degrees of freedom, preferably including angular displacement in two mutually perpendicular planes, while the workpiece and tool may be positioned mutually with at least two additional degrees of freedom. The workpiece is finished by fluid honing with a similarly orientable nozzle.

15 Claims, 37 Drawing Figures

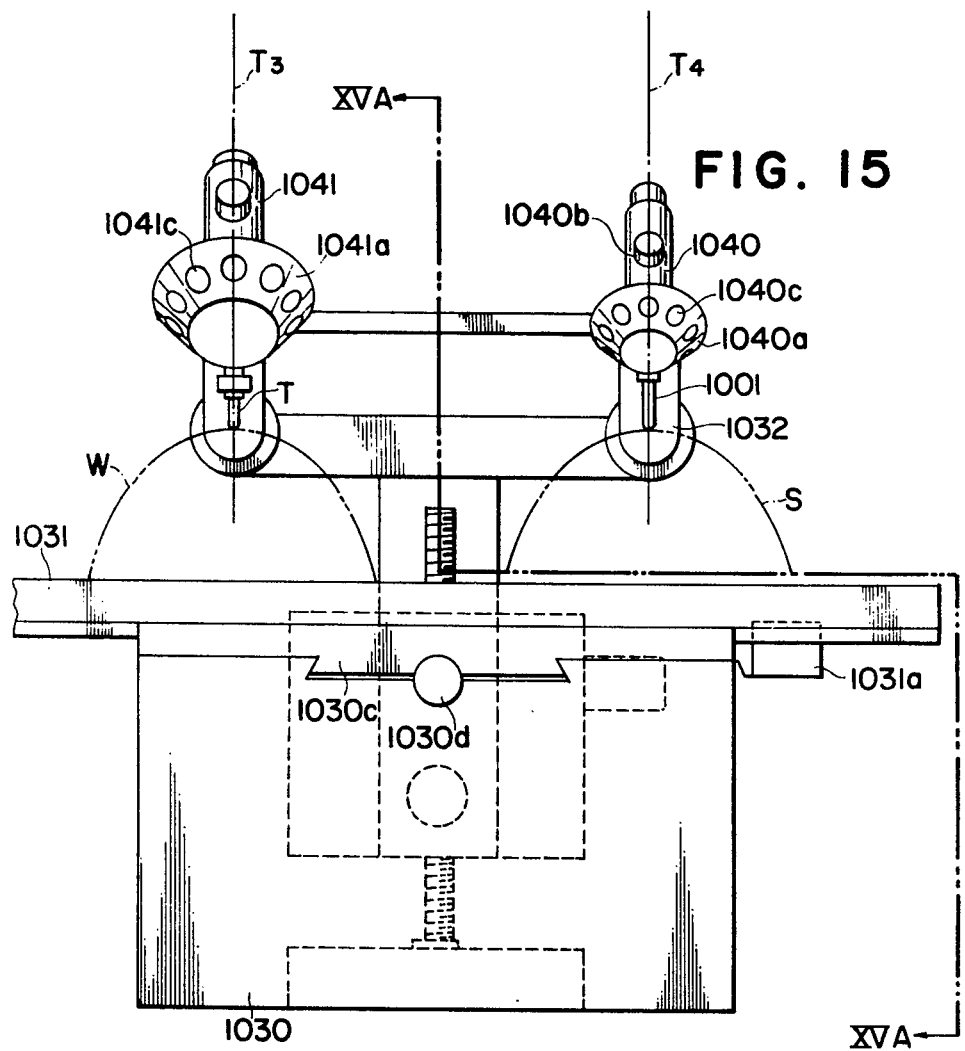

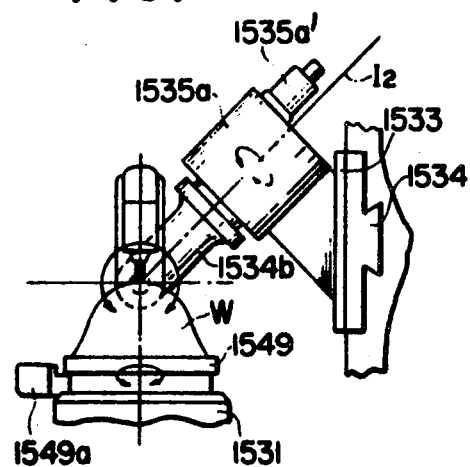
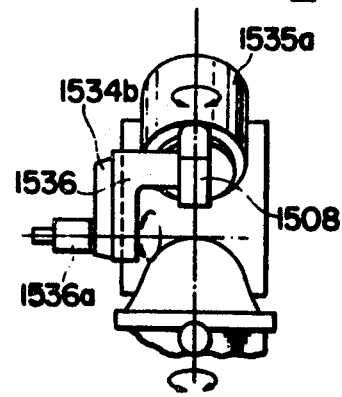
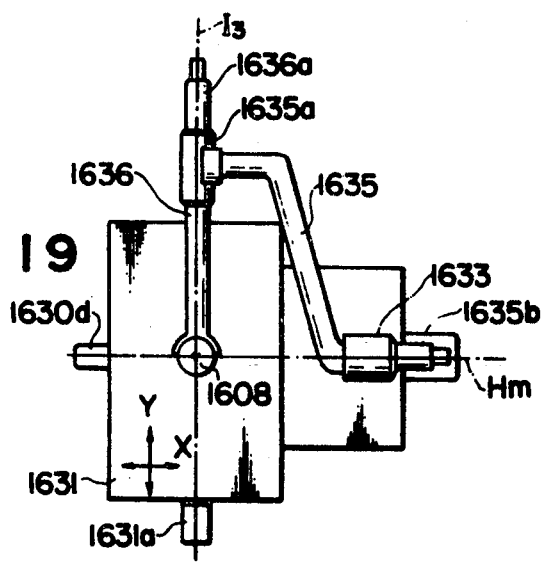

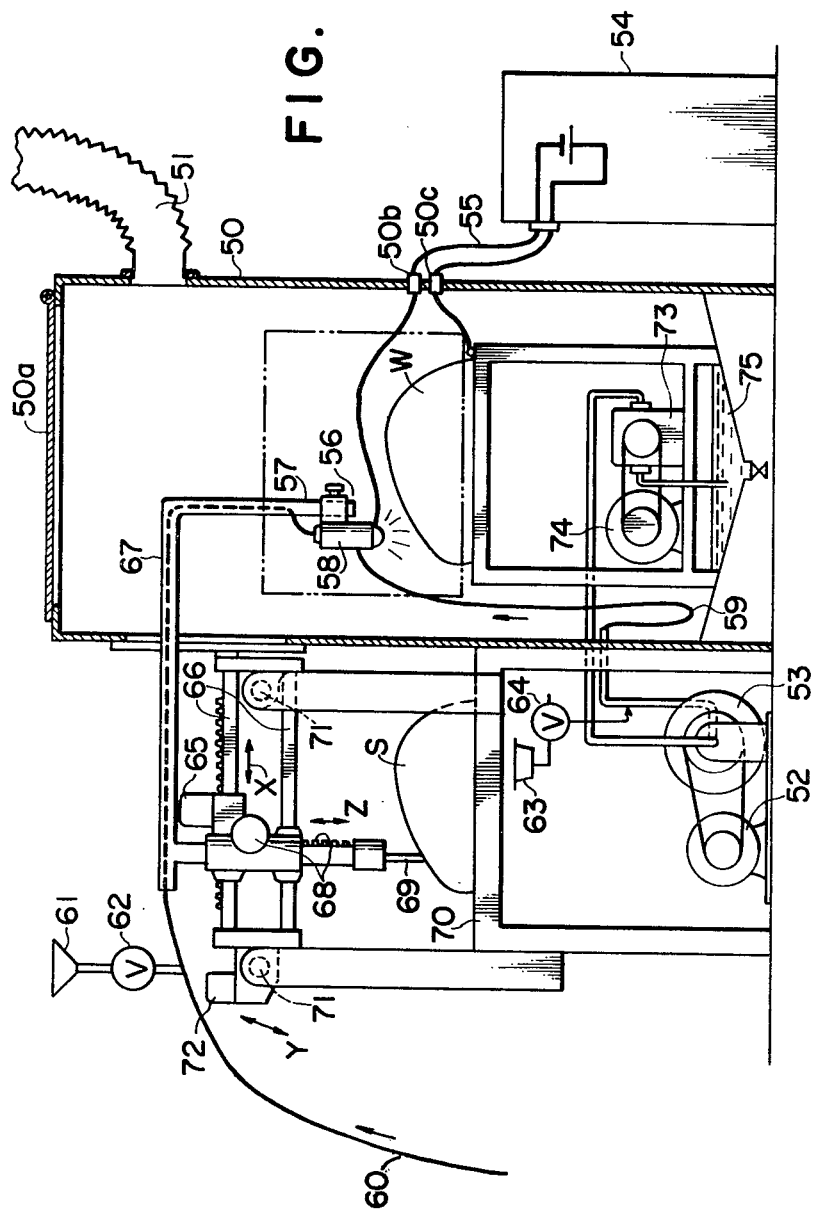

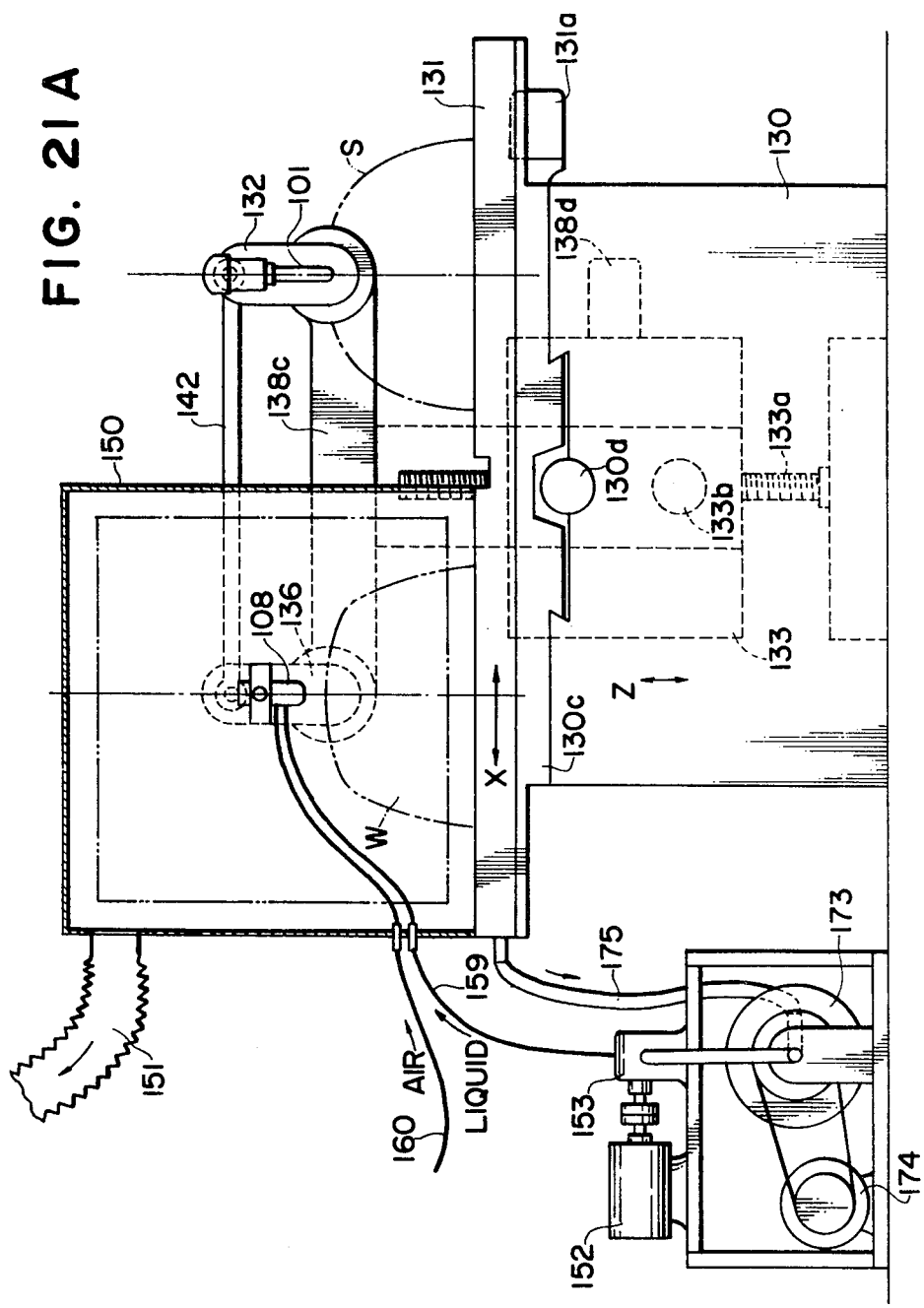

SHAPING APPARATUS

CROSS-REFERENCE TO RELATED APPLICATION

This application is a division of copending application Ser. No. 228,155, filed Feb. 22, 1972 (now abandoned).

FIELD OF THE INVENTION

The present invention relates to the shaping of workpieces and, more particularly, to the production of dies and the like for or by electrical machining and/or the making of electrodes for electrical machining and/or the finishing of copies for use in electrical machining or as products of electrical machining.

BACKGROUND OF THE INVENTION

The term "electrical machining" is used herein to describe electrochemical machining (ECM) and electrical-discharge machining (EDM) both of which apply electrical energy between an electrode and a workpiece, usually across a coolant-filled gap to remove material from the workpiece in a predetermined pattern, generally controlled by the configuration of the electrode. In electrical-discharge machining, the electrical energy applied across the electrode/workpiece system is a capacitive discharge and/or a switched high-energy pulse which breaks down the dielectric fluid in the gap and produces a spark-type discharge bridging the electrode and workpiece, the high kinetic energy of the discharge effecting mechanical removal of the material, localized melting and some degree of vaporization of the workpiece surface. In electrochemical machining, however, the material is removed in accordance with Faraday's law as a result of the application of a substantially unidirectional electric current, or the use of an electrical current having a unidirectional component, to solubilize the workpiece material in the electrolyte forming the coolant.

Electrical-discharge machining, electrochemical machining and high-energy-rate-forming using impulsive discharges as the energy source, have been described in my prior U.S. Pat. Nos. 3,333,081 of July 25, 1967; 3,378,473 of Apr. 16, 1968; 3,232,085 of Feb. 1, 1966; 3,616,343 of Oct. 26, 1971; 3,512,384 of May 19, 1970; 3,417,006 of Dec. 15, 1968; 3,475,312 of Oct. 28, 1969; 3,361,268 of Aug. 12, 1969, and my pending application Ser. Nos. 157,575 of June 28, 1971, now U.S. Pat. No. 3,814,392; 125,192 of Mar. 17, 1971, now U.S. Pat. No. 3,727,489 and 19,364 of Mar. 13, 1970, now U.S. Pat. No. 3,686,461.

These patents, applications, and the references therein cited, disclose various methods in which bodies may be shaped or contoured to the desired configuration. Difficulties have, however, been encountered in the finishing of workpieces using these techniques and even without electrical machining processes the actual finish shaping of highly contoured bodies is difficult. Furthermore, the electrical systems require dies and electrodes of high accuracy and it is often difficult to make electrodes for EDM and ECM purposes in materials such as graphite, where the configuration or topography of the body is complex. Even the finishing of graphite bodies is difficult, when the body is intended for use in an EDM or ECM system.

In recent times, die-using technology is important is many fields of industry where it has been found to replace conventional cutting technology to achieve an improved productivity of articles. Thus, the need for dies in number and kind goes on expanding and recent tendencies show increased demand for larger and larger and/or more or more intricated dies. Die-making, however, represents generally a low quantity output and versatile requirement manufacture and in accordance with currently available methods is a relatively time-consuming and expensive job. Thus, a die shaped with a conventional miller must be finished to eliminate tool marks and pick-feed marks formed on the surface and to meet a strictly due dimensional accuracy and this has been done by hands requiring a relatively high level of skill and a great amount of time. A cost involved in such laborious inspection/finishing work constituted a major part of the total cost involved in the production of a die and even a significant part of the entire cost for articles requiring die and designed to be made therefrom.

OBJECTS OF THE INVENTION

It is the principal object of the present invention to provide an improved shaping system whereby the aforementioned disadvantages can be obviated.

Yet another object of the invention is to provide a method of making a die or electrode, e.g. for EDM or ECM apparatus, of metal or graphite, with improved accuracy and reproducibility and at minimum cost.

Yet another object of the invention is to provide an improved apparatus for the finishing of workpieces with complex contours.

Still another object of the invention is the provision of an improved method of shaping a workpiece with high accuracy, superior finish, high reproducibility and excellent surface quality at relatively low cost with a minimum of labor.

SUMMARY OF THE INVENTION

These objects and others which will become apparent hereinafter, are attained in accordance with the present invention, with a shaping system of the copying type (e.g. a copying apparatus using an electrical-machining tool or a mechanical removal tool, such as a miller, or a finishing tool such as a fluid-honing nozzle), which is adapted to reproduce the contours of a pattern or template in a workpiece while maintaining the tool axis perpendicular to the developing surface of the workpiece at all times. My system is based upon the discovery that accurate mechanical milling, electrical machining, and fluid honing of a contoured workpiece requires that the axis of the tool, e.g. a rotatable miller, an EDM or ECM electrode, or fluid-honing nozzle be oriented perfectly normal or perpendicular to a plane which is tangent to the workpiece at the point to be machined, the imaginary tangent plane being considered in terms of the desired surface configuration to be developed. The imaginary tangent plane at any point of the surface may be defined as the plane common to two mutually orthogonal tangent lines intersecting at this point.

A copy machine according to the present invention may comprise, therefore, a pattern-support and displacement means, a sensing head co-operating with the contoured surface and operatively connected with a tool head, means for movably supporting the workpiece, and means for movably mounting the tool head so that at least five degrees of freedom of relative movement is permitted (i.e. relative displacement with respect to at least five axes) between tool and workpiece whereby the tool is automatically positioned at a machining point on the workpiece corresponding to the sensing point of the pattern and the contour of the pattern is detected to orient the tool to lie normal to the imaginary tangent plane to the surface to be shaped at this point.

When I refer to the operative coupling or connection of the sensing head and the tool head according to the present invention, I generally intend to describe a connection which joins the two for concurrent operation of the tool in accordance with the contours detected by the sensing head. However, this is not to say that a time delay will always be excluded. For example, the sensing apparatus may be located remote from the shaping apparatus and the output signals of the sensor applied to the tool head via a communication network with inherent delays. Also, the output signals of the sensing head may be recorded or electronically modified and stored for subsequent use in operating the tool. The latter system may be used when a number of dies are to be produced with identical configurations or with dimensions which are to be increased in some stepwise manner. In the latter instance, a single pattern may be used and the information stored may have increments added to provide for the stepwise change in dimension.

According to an important feature of the invention, the workpiece is mounted upon a platform, table or carriage while the tool head is juxtaposed therewith. The minimum of five degrees of relative mobility may then be achieve in terms of Cartesian-coordinate movements or polar-coordinate movements or a hybrid of the two. In all cases, however, at least two angular displacements of the tool head in mutually perpendicular planes are desired and preferably the workpiece should also be rotatable. Thus, I may mount the tool so that it is swingable about an axis perpendicular to the tool axis and spaced from or coinciding with the machining point on the workpiece surface. This first angular displacement axis, if offset from the machining point, must be associated with an axial displacement of the tool, i.e. a displacement of the tool along its own axis to ensure perpendicular attack at the machining site. In addition, the first axis of swing of the tool head of the workpiece may be rotated to provide the third degree of freedom and either the head or the workpiece may be displaced through mutually perpendicular increments corresponding to X and Y axes, for example, for proper positioning additional degrees of freedom may also be desirable and have been set forth below.

According to another important feature of the invention, the sensor is biased against the contours of the pattern by fluid pressure, e.g. against the retracting force of a spring, and is provided with linear-differential-transformer outputs serving as mechanical electrical transducers. At least three spaced-apart sensing fingers are provided in the sensing head to generate the minimum of three position signals which define a plane. When the three or more points surround the site of interest, the points will define an imaginary plane perpendicular to the contour at this point. In addition, I prefer to use a central feeder, sensor or pin, caged by the minimum of three fingers or sensors mentioned earlier to indicate the concavity or convexity of the surface, i.e. positive or negative curvature. The sensor, depending upon the position of the central feeler with respect to the periphery area of fillers, is able to resolve any complex topography into regions of convexity and concavity and orient the tool accordingly.

According to another feature of the invention the sensors produce outputs in the form of position-analog signals which serve as inputs to an analog digital converter stage. The pulsed outputs of the latter are used to control incrementally displaceable servomotors (of the tool where no mechanical coupling is provided, or of the sensor head where the latter is mechanically tied to the tool head for common positioning and orientation of tool and sensor). For the two degrees of angular displacement of the tool head, I provide in the circuit of the sensor an analog analyzer whose transfer function is a trigonometric relationship between position increments and angular displacement. If, for example, two sensors spaced apart by the distance L and normally at the same level are axially offset by the increment $\Delta x$, the line defined by the sensor tips has been tilted through the angular increment $\Delta \theta = \tan^{-1}(\Delta x/L)$. The respective transfer function network, of course, is provided for each angular degree of freedom and may be followed by a respective analog/digital converter for pulsing the servomotors responsible for rotation.

An important feature of this invention is the finishing of the workpiece produced as described above by fluid honing, advantageously using the pattern-copying machine or a similar machine. In this case, the finishing operation involves entraining of abrasive substances, e.g. silicon carbide, diamond, tungsten carbide, alumina, etc. in fine particle size against the workpiece in a gaseous or liquid medium, preferably the latter. The liquid may be an electrolyte and, according to the present invention, is accompanied by electrical machining, i.e. electrochemical removal of workpiece material. In a typical case, the hand-finishing of a steel workpiece to a surface finish of 25 microns $H_{max}$ has required 16 hours, while a surface finish of 3 microns $H_{max}$ has been attainable in a small fraction of the time (45 minutes). The fluid-honing apparatus according to the present invention makes use of a five-axis arrangement or five degrees of freedom between the finishing nozzle and the workpiece, preferably maintains the nozzle normal to the workpiece by a means described above, and may be provided with a servomechanism of the type described in the EDM or ECM patents mentioned earlier to maintain a constant gap spacing between nozzle and workpiece. Preferably, the particles and the entraining liquid are evacuated from the machining site.

It is an important feature of the present invention that the fluid-honing is carried out with an electrolyte, using electrochemical machining principles, together with injections of a gas into the high-pressure stream. Advantageously, the gas is air and is employed at a pressure at the nozzle ranging from 2 to 20 atmospheres, the electrolyte pressure may be 1 to 15 $Kg/cm^2$. When the presence of gas, electrolyte and particles is combined with electrochemical honing, optimum results are obtained. While I am unable to fully explain these results, it should be noted that the inclusion of gas in the pressure indicated and the use of a nozzle for these purposes sharply increases the smoothness of the surface beyond any results which may be expected merely from the electrochemical action or abrasive action alone.

According to still another feature of the invention, a system is provided for automatic reproduction of a single or a series of workpieces, the first stage being the production of a drawing and/or model in any convenient manner. The model serves as the pattern for a copy miller of the type described below while the workpiece of the latter may be an electrode material for EDM or ECM machining. Advantageously, the electrode thus produced is delivered by an automatic conveyor to an inspecting station and thereafter to an ECM and/or EDM apparatus as described in the above-mentioned patents and applications. The automatic conveyor means may thereafter carry the rough-shaped workpiece to an EDM finishing machine and thence to a copy-finishing or honing apparatus as will be apparent hereinafter. The original model may serve as the template or pattern in this copy-finishing apparatus, either by the use of computer-stored information or by the direct transfer of the model to the latter. After a product inspection in which the product is compared using computer-stored information with the model, the model may be recycled or discarded. The various conveyors, inspection stations and machines advantageously are controlled by a common sequencing stage. The machines may be numerically controlled or operated by analog circuitry as will be described.

DESCRIPTION OF THE DRAWING

The above and other objects, features and advantages of the present invention will become more readily apparent from the following description reference being made to the accompanying drawing in which:

FIG. 15 is a view similar to FIG. 14 of a pattern-reproduction machine in which the sensing head and the machining head are formed as multiple tool turrets and are linked together;

FIG. 15B is an elevational view of the link of FIG. 15;

FIG. 18D is a side-elevational view of still another head construction;

FIG. 18E is the front-elevational view of this latter head;

FIG. 19 is a plan view, partly in diagrammatic form, illustrating the movement of the sensing head or tool according to another feature of this invention and wherein the arcuate movement of the head is provided at least in part by an offset-bar or crankshaft bar arrangement;

FIG. 21 is a vertical elevational view, partly in cross section, showing a finishing apparatus according to the present invention;

FIG. 21A is a view similar to FIG. 21 but illustrating a modification; and

SPECIFIC DESCRIPTION

Figure 1:
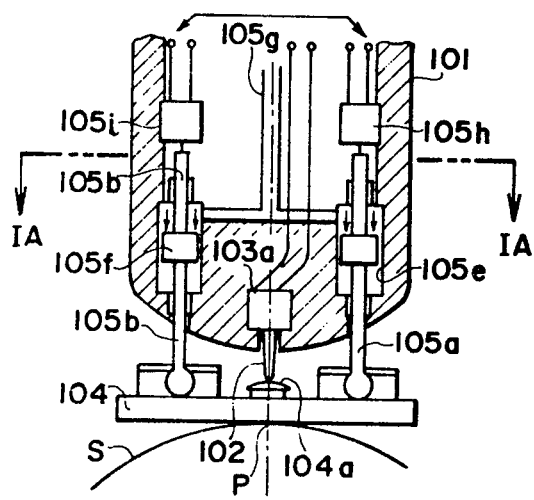
FIG. 1 is an axial cross-sectional view, partly in diagrammatic form, illustrating a signal-generating sensor according to the present invention whereby the contours of a master, template or pattern object are converted into control signals for computer registration and subsequent use, are immediately used for direct control of a shaping machine, etc.
Figure 1B:
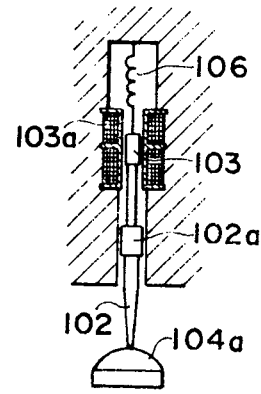
FIG. 1B is a detail view, in axial cross section and partly in diagrammatic form, of one of the sensor elements of the sensing head of FIG. 1 or some similar sensing structure.
Figure 1A:
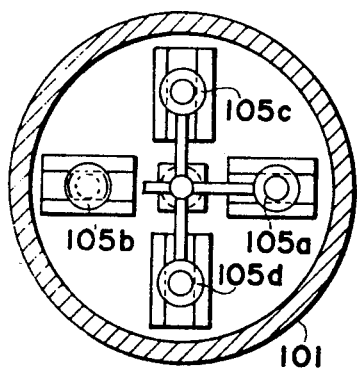
FIG. 1A is a cross section taken along the line IA — IA of FIG. 1.

In FIGS. 1 and 1A, we show a sensing head which may be employed in control systems for a tool or workpiece as described above. As originally noted, it is essential to the present invention that, regardless of the contours of the workpiece, the axis of the tool should always lie perpendicular to the surface, i.e. perpendicular to a tangent to the surface at the point at which the tool axis intersects the workpiece surface. In this manner, a highly accurate and very smooth surface, practically free from the formation of tool marks and pick-feed marks which is the case with conventional three-dimensional milling cutters, is obtained. To afford this orientation, the tools according to the present invention are provided with means allowing many degrees of freedom of movement so that, regardless of the shape of the workpiece, the tool will automatically orient to suit the contour.

A signal for orienting the tool, therefore, may have a number of components including at least three which correspond to the Cartesian coordinates $x$, $y$, $z$ or three which correspond to the polar coordinates $r$ (radius) and the angular displacements of $\Phi$ and $\theta$. These coordinates, of course, define, for any location in space of interest, the tangent and a normal or perpendicular to the tangent for orientation of the tool. In other words at least five degrees of freedom must be provided for the tool and at least five signals representing these degrees of freedom or combinations thereof must be generated or derived by a sensor for the purposes of the present invention. As a caveat it should be noted that, in some cases, it is convenient to combine the signals and the inputs representing the several degrees of freedom so that the signals actually used to control the tool or workpiece directly may represent hybrids of the coordinate signals mentioned. In this manner, a highly accurate and very smooth surface, practically free from the formation of tool marks and pick-feed marks which is the case with conventional three-dimensional milling cutters, is obtained.

Furthermore the sensor of FIG. 1 may be used to produce an output which operates directly a tool in accordance with the pattern-reproduction principles described below with respect to the various machines illustrated. Alternatively, the sensor may provide an output which is recorded or registered as part of a program in a sequencing computer or via numerical equipment so that a programmed tool or machine may be operated subsequently, concurrently or with any desired time delay, to reproduce the sensed pattern. Still another alternative within the ambit of the present invention compares the signals obtained from the sensor with signals representing an ideal configuration or obtained from a model to check the reproduction quality and indicate errors, if desired.

The sensor of FIG. 1 comprises a housing 101 from an end of which projects a pin 102 forming the armature 103 of a linear differential transformer 103a whose coils are shown diagrammatically in FIG. 1B, the differential transformer being represented generally at 103a in FIG. 1. The pin 102 is slidable in a bore 101a of the housing and may be provided with a sliding bearing 102a to reduce the play of the pin within the bore to a minimum. The pin 102 bears against a sensing plate 104 which will always lie tangent to a convex surface S against which it may be applied. A spherically convex boss 104a rises from the plate 104 and is engaged by the pin 102.

Four additional sensing rods 105a, 105b, 105c and 105d are guided axially in the cylinders 105e via the respective pistons 105f, the cylinders communicating via a duct 105g with a source of fluid pressure to bias the pins with constant force in the downward direction. The linear differential transformers 105h and 105i of the rods 105a - 105d operate with coils and armatures as shown in FIG. 1B, while each rod and the pin 102 are biased upwardly by a respective tension spring 106.

Figure 4:
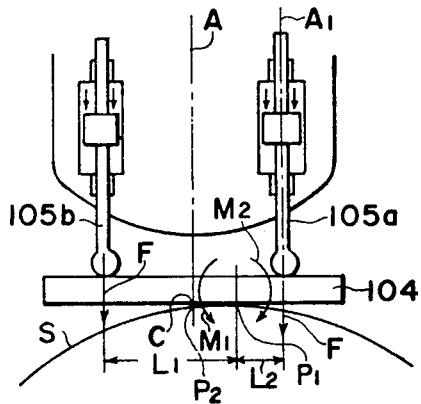
FIGS. 4 and 5 are diagrams representing vertical cross-sectional views showing alternate positions of some points of the head of FIG. 1.
Figure 5:
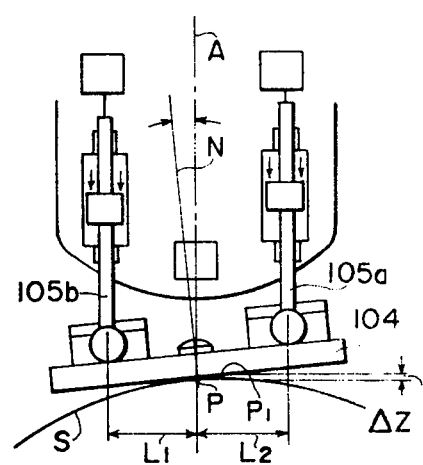

Referring now to FIGS. 4 and 5, it will be apparent that, when the plate 104 lies perpendicular to the axis A of the sensing head against the surface S of a model or pattern, for example, but contacts the latter at a point $P_1$ spaced from a point $P_2$ representing the intersection of the axis A with the surface S, the point $P_1$ represents a fulcrum such that the rod 105a applies a downward force F along the axis A, at a point spaced at a distance $L_2$ from the point $P_1$. Similarly, the force F is applied by rod 105b to the plate 104 at the distance $L_1$ from the point $P_1$, whereupon a counterclockwise moment $M_1$ and a clockwise moment $M_2$ are applied to the rigid plate. $M_1$ exceeds $M_2$ by $F \times (L_1 - L_2)$ so that the plate 104 is rotated about the point $P_1$ in the counterclockwise direction until it assumes the position illustrated in FIG. 5, thereby restoring the moment $M_1$ and $M_2$ to equality.

The rod 105a has been elevated from its original position (FIG. 4) while the rod 105b has been lowered, thereby generating outputs from the respective linear differential transformers to signal the orientation of the plate 104. Since four such outputs are obtained, the orientation of the plate 104 is positively determined as the tangent to the surface and a tool controlled accordingly. Since the center of curvature of the boss 104a is centered at the precise intersection of the axis A with the underside of the plate 104 when the latter is normal to the rods 105a - 105d and pin 102, a simple rotation of the plate along the surface, without any axial displacement of the center $c$ may result. More generally, however, the displacement will be a consequence of a shift from the point $P_1$ to the point P which corresponds to a vertical displacement $\Delta Z$. This axial displacement is, of course, sensed by the pin 102 and its differential transformer.

Figure 3:
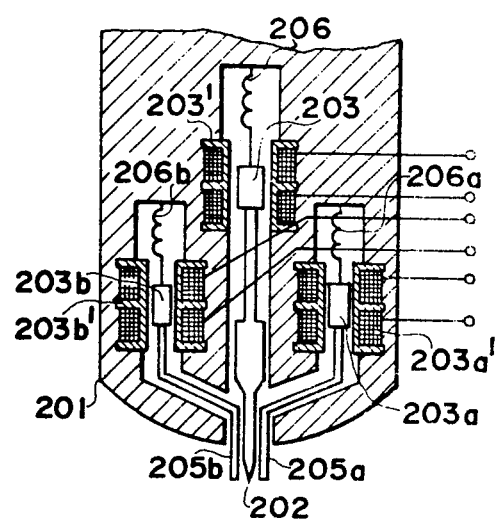
FIG. 3 is a view similar to FIG. 1 showing details of another sensing head.
Figure 3A:
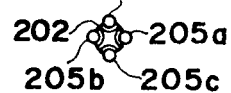
FIG. 3A is an end view of the sensing end of the head of FIG. 3.

The composite signal represents the dislocation of the normal N from the axis A and can be represented as Cartesian coordinate signals, geometric signals converted from the Cartesian siangls, polar signals or any synthesis or hybrid thereof as will be apparent later. The position of the normal N taken together with the displacement $\Delta Z$ is transformed into a similar off-normal displacement of, for example, a tool 107 in its holder 108 to shape the workpiece surface W. When the input to the tool is that of Cartesian signals, a carriage may shift the axis $T_1$ to the left $(T_2)$ by a distance $\Delta X$, lower the center of rotation of the tool T by a distance $\Delta Z$ and rotate the tool about the axis C through the angle $\Delta \theta$ to properly position it in conformity with a normal to the model and workpiece surface. Of course in the three-dimensional configuration, a rotation about the axis D is also required through the angle $\Delta \theta$. The distance of center C or axis D from the workpiece, represented by the output of the differential transformer assigned to the pin 102 may be established at $l$. It should be appreciated that 4 to 5 signals will suffice for locating the tool normal to the workpiece surface for effective contouring in conformity to the model. In FIG. 3, I have shown a sensing head which differs from that of FIG. 1 in that no plate is provided to define the tangent surface to which the normal or perpendicular position is oriented. In this system, the sensing fingers 205a, 205b, 205c and 205d are located at the vertices of a square in close-spaced relationship and surround or form a cage for the central pin 202. The fingers 205a - 205d are bent outwardly and upwardly to carry magnetic armatures 203a, 203b etc. cooperating with the coils of the linear differential transformers 203a', 203b' etc. The sensing fingers are also suspended from coil springs 206a, 206b as described above, while the central finger 202 carries the armature 203 cooperating with the linear differential transformer 203' and is suspended from the spring 206. This embodiment differs from that of FIG. 1 in that the plate is generally tangent at only one point to the surface and the outputs of the several linear differential transformers determine exclusively the normal to the tangent plane at this point. However, with intricate contours, the plate 104 may bridge two or more crests so that its orientation no longer represents a true tangent at any particular high point. In this case, the system of FIGS. 3 and 3A may be used, the fingers 205 and 205a – 205d being sufficiently closely spaced as to define an imaginary plane of tangency from which the normal position can be deduced.

The system of FIG. 3 may also be used to control the tool, in which case the fingers 205a – 205d may be driven by respective servomotors to which a control signal is fed from a sensor and which will tend to position a floating housing 201 to orient member 202 along a normal or perpendicular to the surface. In that case, the finger 202 may be replaced by a tool, e.g. an electrode (in the case of electrodischarge machining or electrochemical machining) or a material-removal mechanical device such as a milling cutter.

Figure 2:
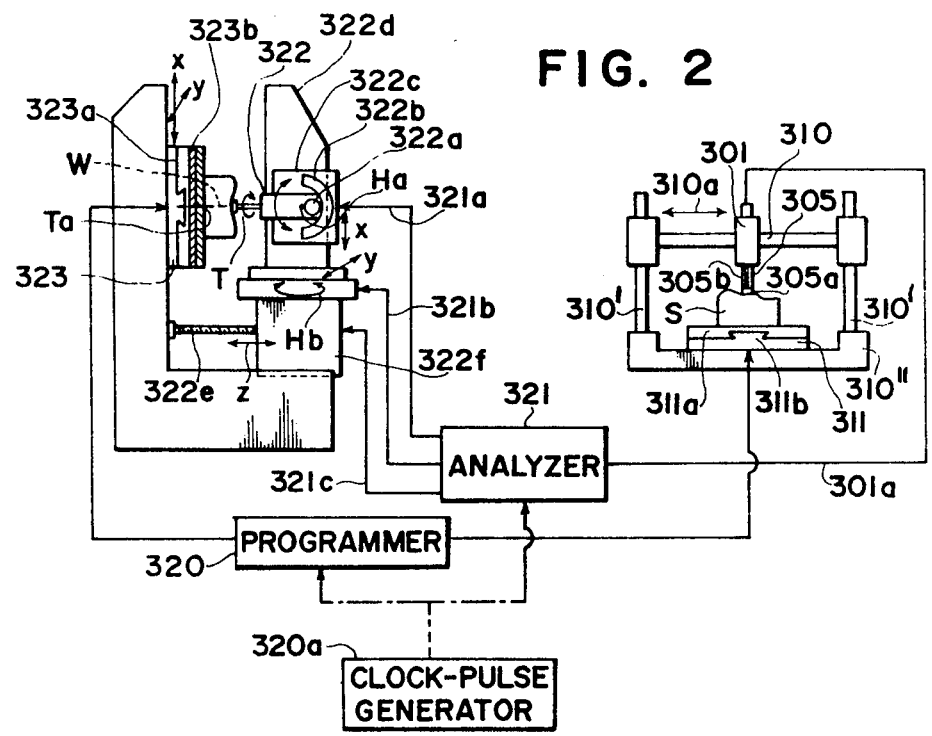
FIG. 2 is a vertical elevational view, partly schematic, showing a pattern-shaping machine according to an embodiment of the invention, using a sensor of the type shown in FIGS. 1, 1A and 1B and illustrating other features of the invention.

In FIG. 2, we have shown an apparatus for reproducing a shape of a master or pattern and which can be used in electrode production for EDM or ECM systems as described in greater detail below. The apparatus in this case comprises the sensing head 301 with the outer array of fingers 305a, 305b etc. and a central finger 305 as described for the sensors of FIGS. 1 and 3. The head 301 is shiftable upon a rail 310 in the horizontal direction 301a and is supported on posts 310' on a base 310" above a cross-feed arrangement 311. The latter comprises a table 311a shiftable on an appropriate V-way perpendicular to the plane of the table and to the rail 310 and a table 311b which may be shiftable parallel to the rail 310. The posts 310' may be formed as lead screws to raise and lower the head 301. In other words the carriages and head-positioning mechanisms permit location of the head at any point upon the template or pattern S. Such positioning means uses the three linear or Cartesian coordinates including mutually perpendicular movements in the horizontal plane, corresponding to x and y coordinates and movement in a vertical direction corresponding to the z coordinate. It should be understood that a polar-coordinate system may also be used to position the sensor at any location as will be described below. The movements of the template, pattern or master are controlled by a programmer 320 which coordinates the position of the pattern with that of the workpiece W and may be tripped by a timer such as a clock-pulse generator 320a. The output signals from the head 301 are communicated at 301a to a signal-sorting system, e.g. an analyzer 321 whose function it is to convert the signals of the individual sensing fingers into movements of a tool T sufficient to orient the latter at a normal to the surface at the appropriate point at which the workpiece W may be oriented. The analyzer thus may have outputs 321a, 321b and 321c corresponding to three coordinates of orientation of the tool T.

The tool, a milling cutter, is rotated about its axis $T_a$ by a motor 322 in the head, the motor being supplied with electrical energy by suitable conductors not shown (see U.S. Pat. No. 3,559,529). The head containing the motor is pivotal about an axis Ha perpendicular to the plane of the paper, by a pinion 322a meshing with a rack 322b centered on the axis Ha. In addition, the contoured rack/pinion/head system 322, 322a, 322b can be shifted vertically in the direction of arrow V corresponding to the x or y coordinate mentioned earlier. For that purpose, the carriage 322c is mounted upon a post 322d forming a vertical guide. The vertical drive may be supplied by one of the inputs from the analyzer 321. Another input from this analyzer rotates a leadscrew 322e to shift the support 322f for post 322d and thereby generate relative movement of the tool and the workpiece corresponding to the z coordinate. The angular displacement of the head about axis $H_a$ may result from another input from the analyzer 321 while still a further input may rotate the head assembly about a vertical axis as represented by the arrow $H_b$.

The workpiece W is, moreover, carried by a cross-feed arrangement 323 including carriages 323a and 323b movable along the x and y coordinates respectively and possibly a turntable if rotary movement is desired.

Figure 6:
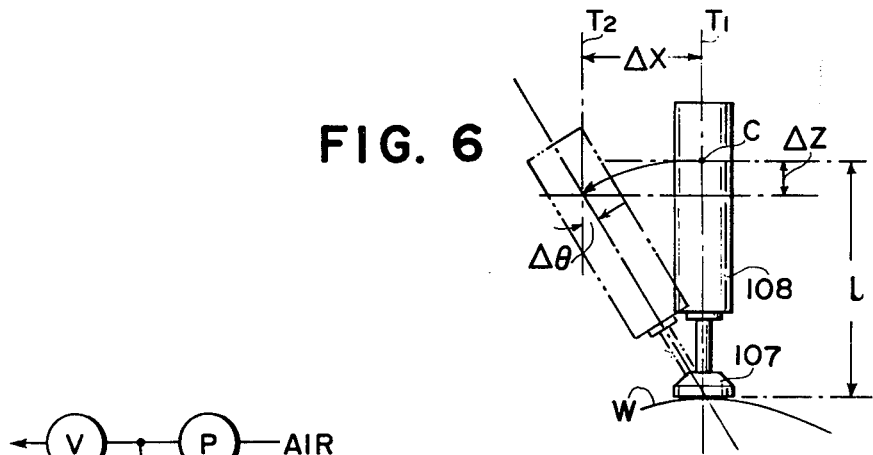
FIG. 6 is a diagrammatic elevational view showing the motions of a tool according to the invention.

From an input represented by the sensors, the tool T may be shifted to the several coordinates as described in connection with FIG. 6 to assume a position in which its axis $T_a$ lies perpendicular to the imaginary tangent plane to the machine workpiece surface as described in connection with FIG. 6.

Figure 7:
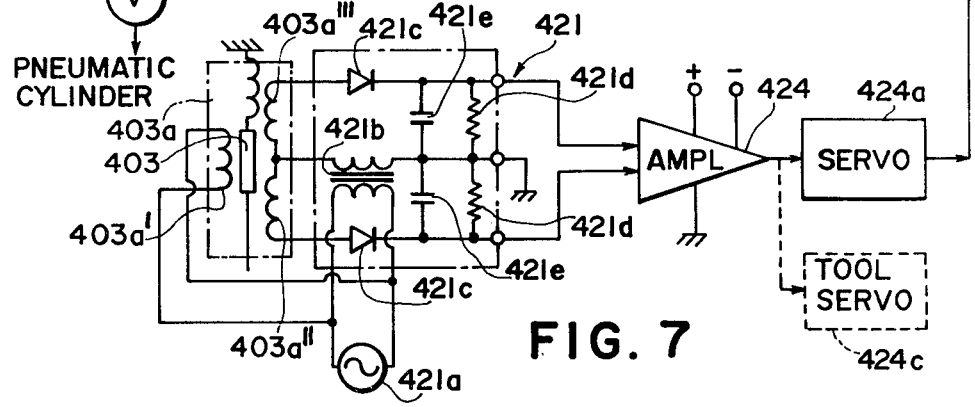
FIG. 7 is a circuit diagram illustrating how the output signals of the sensors of the heads of FIGS. 1 and 3 may be derived.

In FIG. 7, I show a portion of a signal analyzer for a sensor according to the present invention, the sensor including the linear differential amplifier 403a cooperating with the armature 403 of one of the fingers or feelers described in connection with FIGS. 1 or 3. The linear differential amplifier 403a comprises an input coil 403a' and a pair of output coils 403a" and 403a"'. An alternating current source 421a of the analyzer 421 is connected across coil 403a' and applies electric current to the centertap of the differential transformer via an isolating transformer 421b.

Each of the coils 403a" and 403a"' is connected in series with the secondary winding of isolating transformer 421b, respective rectifier diodes 421c and load circuits represented by resistors 421d. Capacitors 421e are connected across the output resistors. It will be apparent that the analyzer circuit 421 of FIG. 7 is a phase descriminator which produces an output representing the dislocation of the core 403 from its median position. For example, as the core 403, or armature, of the sensor shifts downwardly, the coupling between coils 403a' and 403a" is increased while the coupling between coils 403a' and 403a"' is decreased. The phase shift output, integrated via the network 421e, 421d applies a signal which is the analog of the displacement to one input of the amplifier 424. When the core 403 moves in the opposite direction, a comparable signal is applied to the other input of the amplifier 424. The amplifier 424 may be any conventional analog type servoamplifer (see pages 177 ff. of SERVOMECHANISM PRACTICE, McGraw-Hill Book Co., New York 1960). The amplified signal is applied to a servomotor 424a which may represent a valve controller (pages 403 ff. of SERVOMECHANISM PRACTICE) to control a valve 424b of the pneumatic system biasing the finger toward the pattern. The servomotor 424a thus constitutes part of a feedback path which, in accordance with position-servoprinciples, ensures that the output signal always represents the position of the sensor (see pages 89 ff. of SERVOMECHANISM PRACTICE). Another output signal is derived at 424c and may be applied to the servomotor controlling the tool.

Figure 7A:
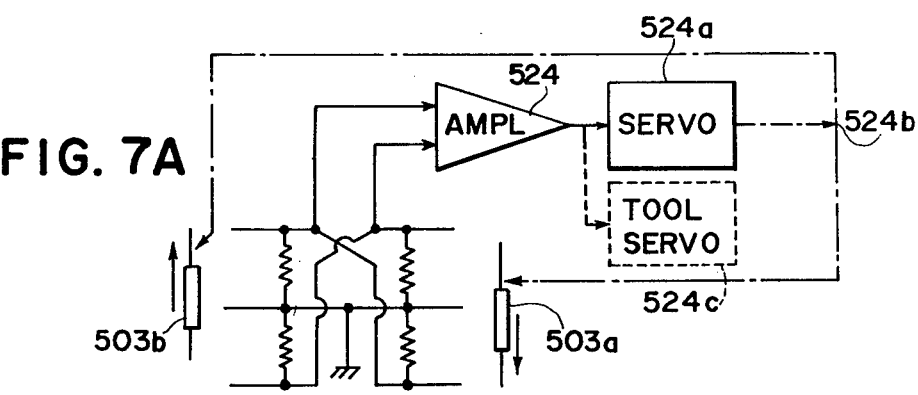
FIG. 7A is another circuit diagram illustrating the operation of the sensing heads.
Figure 8:
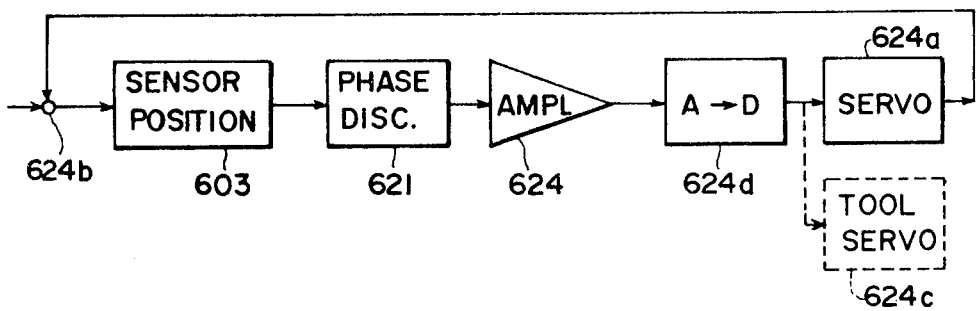
FIG. 8 is a block diagram illustrating other features of the circuit of the present invention.

In FIG. 7A, I show a modification of the basic circuit of FIG. 7 wherein each of the outputs tapped across the resistors 421d for a pair of sensors, e.g. those associated with armatures 503a and 503b, are applied to a comparator amplifier 524 to define a relative displacement of the two sensors and hence the inclination of a line connecting the tips of the sensors to the median position. Here, too, the output is applied to the servomotor 524a and thence in a feedback path 524b to the sensors. The control signal for rotating the head in accordance with the tilt of the tangent plane can then be applied to one of the servomotors of the head at 524c as originally described. The systems of FIGS. 7 and 7A can be represented in block diagram form as shown in FIG. 8 in which the stylus position or sensor position is derived at block 603, the output in terms of phase difference being supplied at the phase discriminator 621 whose analog-type output is amplified at 624. In place of direct analog control in this embodiment I prefer to convert the analog signal into a digital signal in the analog-digital converter 624d and control the stylus by pulse-modulated servomotor 624a. The digital pulse train is here also used to operate the tool-control stepping mechanism at 624c. The analog-digital converter can be of the type described in pages 674 – 675 of PULSE, DIGITAL AND SWITCHING WAVEFORMS, McGraw-Hill Book Co., New York, 1965. The servomotor 624a feeds back at 624b as described previously.

Figure 9:
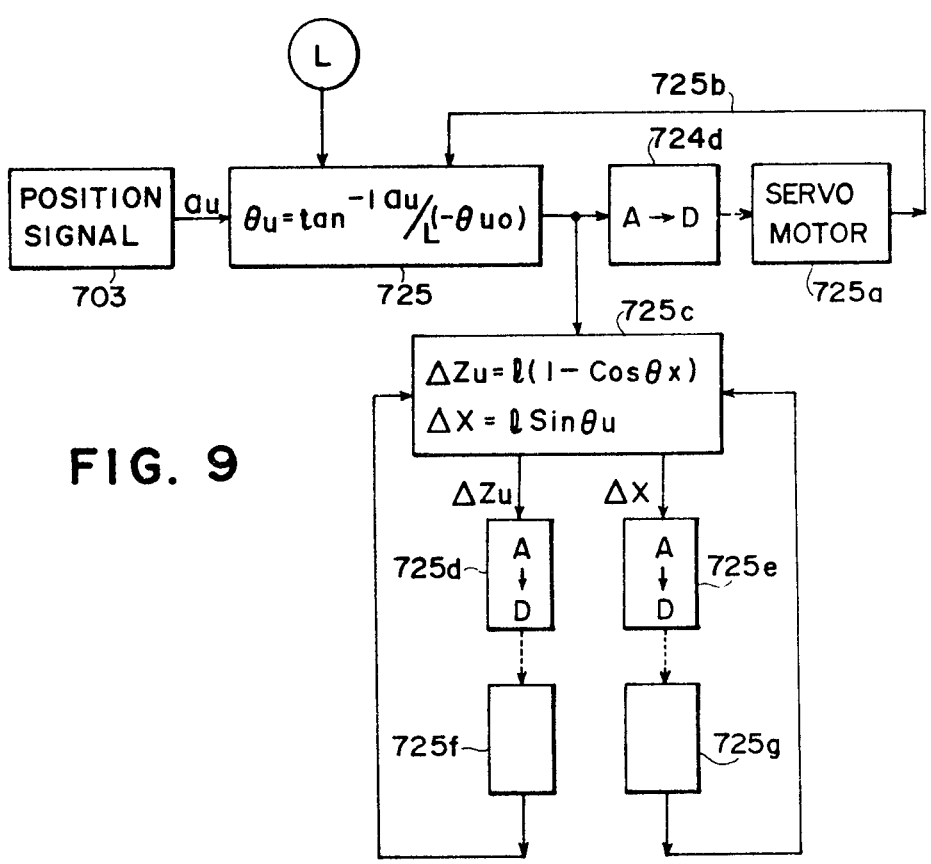
FIG. 9 is a block diagram including the transfer functions of some elements of the sensor output circuits in accordance with the present invention.

FIG. 9 represents, in block-diagram form, the tool-control arrangement of the present invention. The input, e.g. as derived from circuit 7 or 7a or even circuit 8, is a position signal represented at 703 in terms of an analog voltage or current which is represented at $A_u$. This signal is fed into a circuit 725 having an appropriate transfer function as illustrated to calculate the angle of tilt $\theta_u$ from the relative displacement of the two sensors $A_u$ and the distance between them L as a difference from the original angular position $\theta_{uo}$. The result is an analog output representing angle of tilt of the tangent plane which is applied through the analog digital converter 724d whose output is delivered to the servomotor 725a controlling one of the positioning movements of the tool. The feedback path 725b, of course, establishes the $\Phi_u$ initial condition for the next control increment while the input L is a coefficient input, e.g. via a coefficient potentiometer, representing a constant of the system, e.g. the distance between two sensors, or another variable from which the angle of tilt may be deduced (see FIG. 6). To control the workpiece positions, the angle of tilt is transformed by the usual geometric relationships of sine and cosine in block 725c to outputs $\Delta X$ and $\Delta Z$ which are transformed into pulse trains by analog digital converters 725d and 725e to produce output signals controlling the tool servos 725f and 725q positioning the carriages to establish the machining site in accordance with the degree of tilt.

Figure 10:
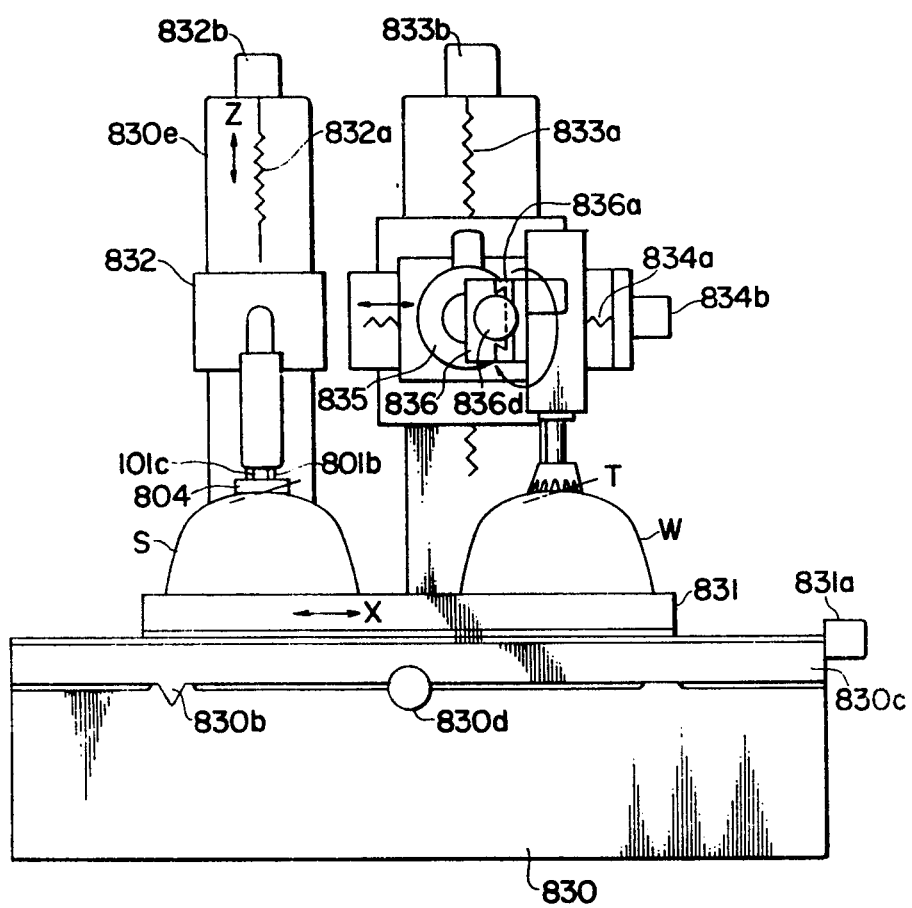
FIG. 10 is a vertical elevational view, partly in diagrammatic form of an apparatus for the direct production of the contours of a pattern in a workpiece according to the invention.
Figure 11:
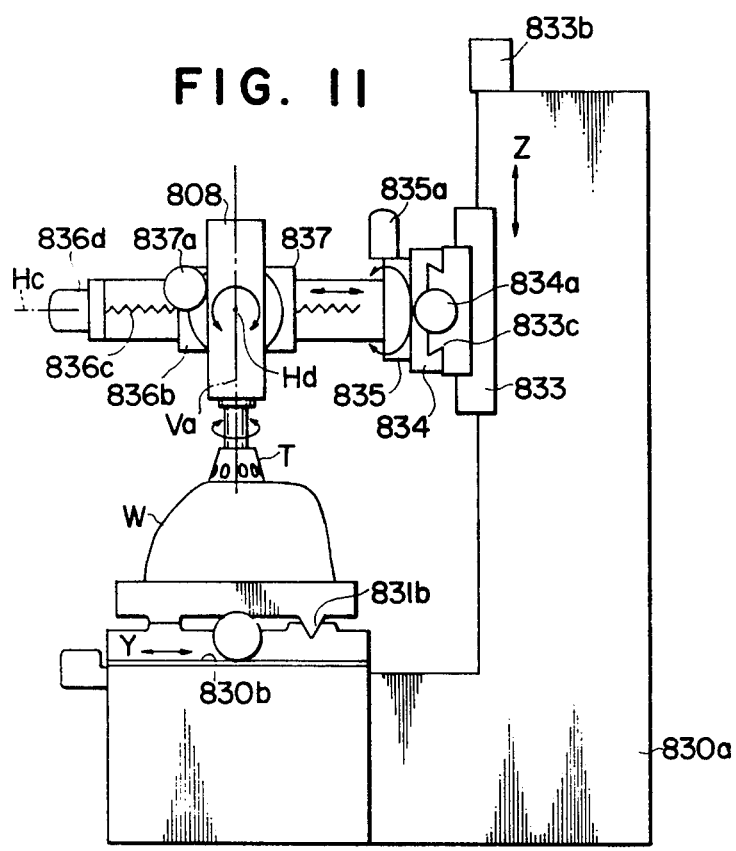
FIG. 11 is a side-elevational view of the machine of FIG. 10.
Figure 12:
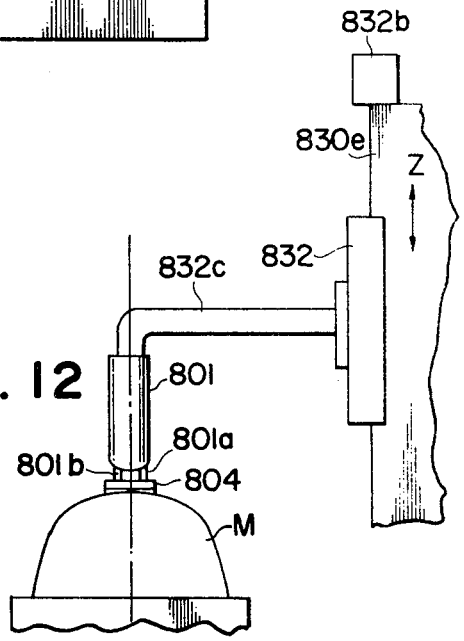
FIG. 12 is a detail view of the sensing head according to the invention.

The FIGS. 10, 11 and 12, I have shown a copying apparatus embodying the principles of the present invention. More generally, the apparatus comprises a pedestal or support 830 having an upright 830a and forming a horizontal track 830b for a horizontal table 830c shiftable in the Y direction as best seen in FIG. 11 by a leadscrew mechanism driven by the servomotor 830d. This table carries another horizontal platform 831 shiftable in the X direction (FIG. 10) perpendicular to the direction of movement of the table 830c by a leadscrew arrangement (not shown) and a servomotor 831a. The horizontal guide for platform 831 is a V-way as represented at 831b and corresponds to the V-way 830b. The workpiece U and the pattern S may be mounted upon the platform 831 by any conventional means, e.g. T-slots in the platform connected by screw threads with the workpiece.

Another upright 830e rises from the pedestal as shown in FIG. 10. The upright 830e forms a vertical guide along which the sensor carriage 832 is vertically movable in the direction Z under the control of a lead screw 832a illustrated diagrammatically and driven by a servomotor 832b. The carriage 832 supports a horizontal arm 832c (FIG. 12) from which the sensor 801 depends. As described in connection with FIG. 1, the sensor is provided with a plurality of sensing fingers 801a, 801b, 801c etc. swivelably connected to a plate 804 which rests tangentially upon the concave surface of the pattern S. When convex surfaces are encountered or shape changes in contour are to be detected, the head 801 is replaced by the sensing head 201 described in connection with FIG. 3. The outputs from the differential transformers may be delivered to the control circuitry through the arm 832c and may be housed in the pedestal of base 830.

Parallel to the upright 830e, the upright 830a carrying the tool head is provided with a vertically shiftable carriage 833 movable in the direction Z by a leadscrew 833a shown diagrammatically in FIG. 10 and driven by a motor 833b. As is apparent from FIG. 11, the carriage 833 forms a V-way 833c for a cross-fed carriage 834 which is driven by a lead screw represented diagrammatically at 834a and a motor 834b in the Y direction. The cross-feed table 834 forms the base of a turntable 835 rotatable about a horizontal axis $H_c$ (FIG. 11) and driven by a servomotor 835a whose pinion may engage a ring-gear rack carried by the turntable 835. The turntable also supports a horizontal arm 836 forming a V-way 836a for a slide 836b which may be advanced and retracted in the X direction (FIG. 11) by the diagrammatically illustrated leadscrew 836c and the servomotor 836d.

The slide 836b likewise forms a support for a turntable 837 with external gearing driven by a pinion from the motor 837a about the horizontal axis $H_d$. As can be seen in FIG. 11, the tool head 808, which can carry the electric motor rotating the milling cutter R about the axis $V_a$, can be tilted in the clockwise or counterclockwise sense about the axis $H_d$ in the plane of the paper in FIG. 11, i.e. in the plane of the axid $V_a$. By shifting the carriage 836b along the arm 836, and by raising and lowering the arm via carrier 833, it is possible to provide three degrees of freedom of movement to locate the tool at any point upon the surface of the workpiece W and also tilt the tool axis in this plane to a position normal to a tangent to the surface in this plane. By rotating the arm 836, moreover, it is possible to tilt the axis $V_a$ in the plane of the paper in FIG. 10, i.e. about an axis perpendicular to the axis $V_a$ and also orthogonal to the axis $H_d$. The horizontal movement in this case is effected by the carriage 834. The two additional degrees of freedom ensure that the axis of $V_a$ will be normal to a tangent to the workpiece surface perpendicular to the plane of the paper in FIG. 10. The axis $V_a$ is then normal to two mutually perpendicular and intersecting tangents at the machining site so that it is normal to the imaginary tangent plane. The inputs for the servomotors 833b, 834b, 836d, 835a and 837a are derived from the sensor and processed as previously described (FIGS. 7 and 9).

Figure 14:
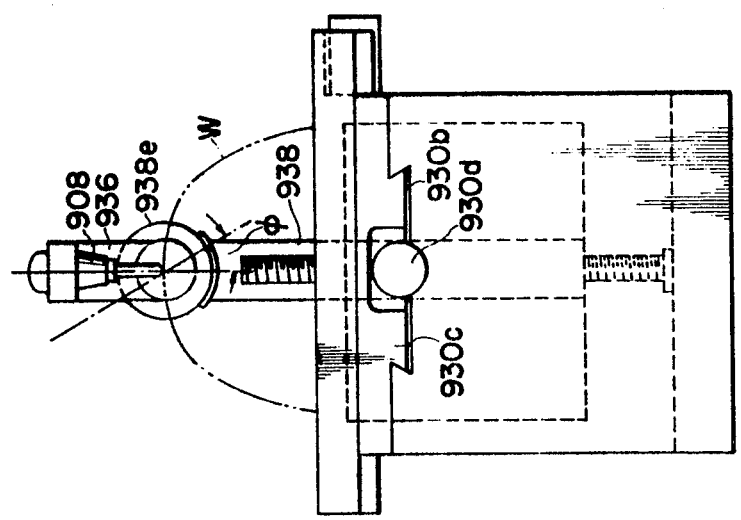
FIG. 14 is a front-elevational view of the machine of FIG. 13.
Figure 13:
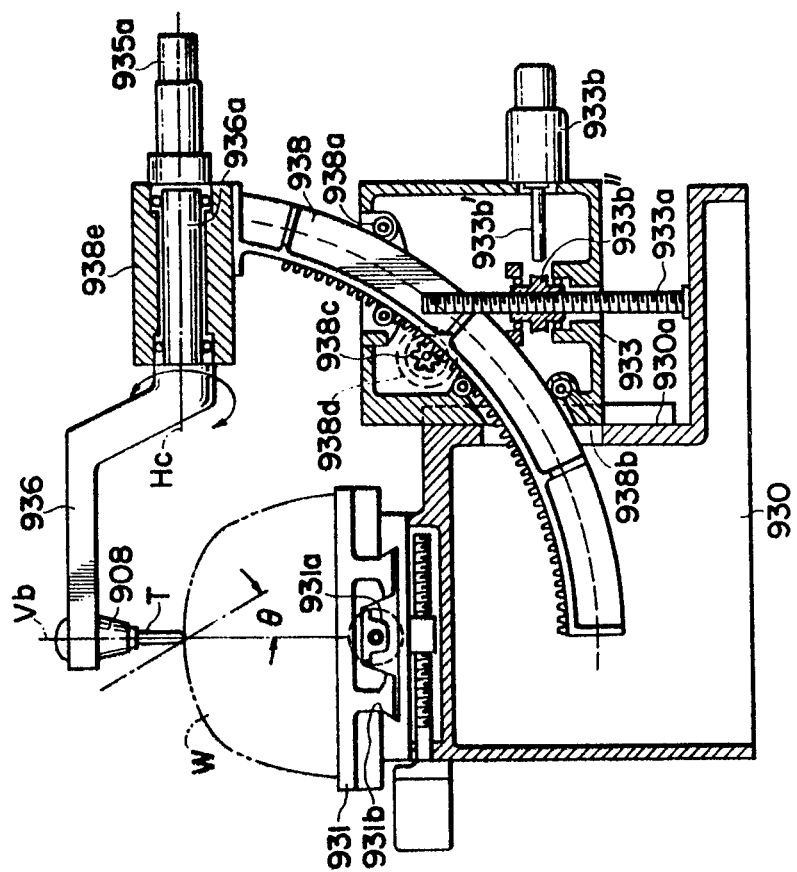
FIG. 13 is a side-elevational view, partly broken away and partly in diagrammatic form of another machine construction with extended mobility or additional degrees of freedom for the operating head which may be provided as a sensor or as a tool according to the invention.

Another arrangement permitting five degrees of freedom, at least, for the machining of the workpiece is represented in FIGS. 13 and 14. In this embodiment, the pedestal 930 forms a horizontal V-way 930b for a table 930c driven by a motor 930d. This table, in turn, forms a V-way 931b for a platform 931 displaceable by the servomotor 931a and another leadscrew in the horizontal direction perpendicular to that of table 930c. Again any location of the workpiece W can be positioned beneath the tool T on this longitudinal and cross-slide arrangement which is conventional in machine tools generally. According to the invention, however, the pedestal 930 forms a vertical guide 930a for a vertically movable carriage 933 which is driven by a servomotor 933b via a worm 933b' and a worm wheel 933b'' forming the nut for the fixed leadscrew 933a. The vertically movable carriage 933 forms a housing for an arcuate rack 938 having its center of rotation at the tip of tool T, the rack being shiftable about a horizontal axis perpendicular to the plane of the paper in FIG. 13 at this center. The rack 938 is guided in its arcuate movement by rollers 938a and 938b and is driven by a pinion 938c of a servomotor 938d. The rack also carries a bearing sleeve 938e in which the shaft 936a of an arm 936 is journaled for rotation about a horizontal axis $H_e$ which intersects at the right angle with the tip of the tool. A servomotor 935a is provided to rotate the arm 936 which carries the tool head 908 with its electric motor. The axis of the tool T is represented at $V_b$. In this embodiment, the minimum of five degrees of freedom is provided by the tilting movement of the rack 938 which can tilt the axis $V_b$ to any angle $\theta$ in the plane of the paper in FIG. 14, the rotation of shaft 936a when can tilt the axis Vb to any angle $\Phi$, the vertical movement of the carriage 933 and the two horizontal dimensions of movement provided by the table 930c and the platform 931. The servomotors for this drive may be operated by a recorded program, from any sensor arrangement as described in connection with FIGS. 1, 3 and 10 – 12, or by a sensing head as shown in FIGS. 10 – 12 and mounted on the same support. It is apparent that, by simply replacing the tool head and the workpiece with the sensor head and the model, respectively, the structure of FIGS. 13 – 14 may form a pattern sensing arrangement as an alternative of the different embodiments thereof as noted previously and which will be shown hereafter. In addition or alternatively the machining head of FIGS. 10 – 12 may be replaced by the head and control system of FIGS. 13 and 14.

Figure 15A:
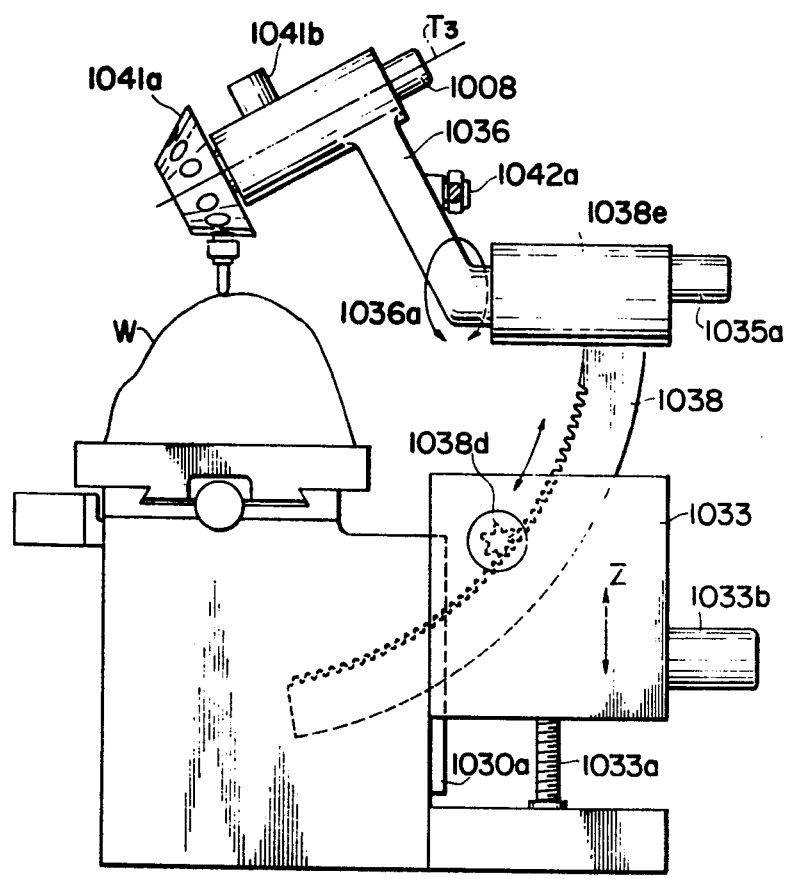
FIG. 15A is a view taken along the line XVA — XVA of FIG. 15.

In FIGS. 15, 15A and 15B, I have shown another embodiment of a copying machine according to the present invention, the machine having basically the construction described in connection with FIGS. 13 and 14. In this embodiment, however, the pedestal 1030 carries a table 1030c which is shiftable perpendicular to the plane of the paper in FIG. 15 by a servomotor 1030d. A platform 1031 is carried by this table and is shiftable in the horizontal plane but perpendicular to the direction of displacement of table 1030c by the motor 1031a. Both the pattern S and the workpiece W may be mounted upon the platform 1031. A single carriage 1033, which is vertically shiftable in a guide 1030a by a leadscrew arrangement 1033a etc. driven by motor 1033b serves to carry both the tool T and the sensor 1001 which may have the configuration illustrated in FIG. 3. To this end, the arcuate rack 1038 is mounted in the carriage 1033 (mounting means as shown in FIGS. 13 and 14) and is driven by the pinion 1038c of motor 1038. The arcuate rack 1038 defines a rotation axis at the cutting edge of tool T. The rack 1038 is provided with a horizontal beam 1038e forming bearings for a pair of bars 1036 and 1032 which are rotatable in respective bearing sleeves of the bar 1038e as represented by the arrow 1036a. The drive motor for this rotary movement is shown at 1035a with analogy to FIGS. 13 and 14.

In this embodiment, however, each of the heads 1040 and 1041 for the sensor and workpiece, respectively, comprises a turret 1040a and 1041a which is rotatable about an axis $T_3$ or $T_4$ which lies at an angle to the tool or sensor axis but is coplanar therewith. A stepping motor 1040b or 1041b is provided to rotate the turrets which have sockets 1040c and 1041c adapted to receive sensors of varying sensitivity and spread and cutting tools of varying diameters and fineness. The drive motor for the two can be provided at 1008.

In the embodiment of FIGS. 15, 15A and 15B, the sensor may be electronically coupled to the tool head as previously described so as to rotate the arm 1038 or the arm 1036 as required. The electronic and circuit components for this purpose have already been described. However, I may dispense with many of the electronic components by coupling the arms 1032 and 1036 for joint rotation by a link 1042 connected via swivels as shown at 1042a to each arm. Since the X and Y horizontal coordinates are defined by the joint movement of workpiece W and model S on a common table, the angular displacement of the tool and sensor through the distance $\theta$ by the common coupling of sensor and tool to the arcuate tack 1038, the common angular displacement $\Phi$ by the link 1042 and the common elevation Z by the use of a single carriage 1033, it will be apparent that the sensor need only be servocontrolled to maintain its own perpendicularity to the model whereby the perpendicularity of the tool will be ensured. In this case, the connections illustrated in FIGS. 7, 7A and 8 to the tool servomotors may be eliminated.

Figure 16A:
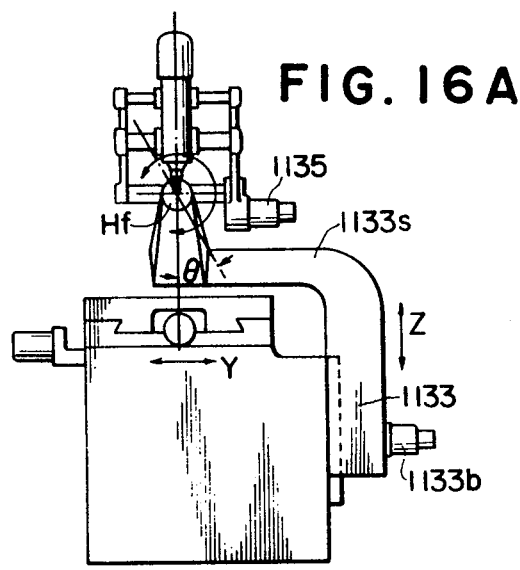
FIG. 16A is a side-elevational view, in diagrammatic form, of another pattern copying machine whose heads have multiple degrees of freedom and are coupled together by a different linkage.
Figure 16B:
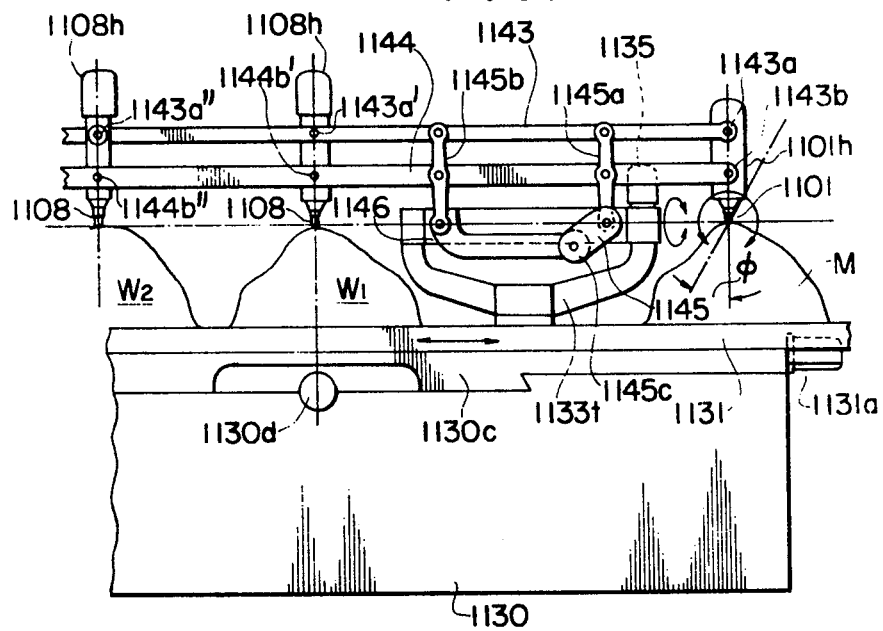
FIG. 16B is a front-elevational view of the machine of FIG. 16A.

A similar mechanical coupling arrangement is apparent in FIGS. 16A and 16B wherein a single model M is used as the template for a plurality of workpieces $W_1$ and $W_2$. In this system, the base 1130 provides a single horizontal table 1130c positioned in the horizontal direction Y by a servomotor 1130d. A platform sufficient in length to carry all of the workpieces and the model is mounted for movement in the direction X upon the table 1130c as shown at 1131. The servomotor for displacing this platform is represented at 1131a. The sensor 1101 and the tools 1108 are here interconnected by a parallelogrammatic linkage for joint inclination in the plane of the axes of the tool and sensor heads. The sensor head 1101h is articulated to a pair of link bars 1143 and 1144 at spaced-apart locations 1143a and 1143b along the sensor axis. As shown in FIG. 16A, similar pairs of bars may be provided on both sides of each head. Pivots 1143a', 1143a'' and 1144b', 1144b'' similarly connect the parallel bars 1143, 1144 to the tool heads 1108h which may be provided with electric motors to drive the tools. Hence if the bar 1143 shifts to the right relative to the bar 1144, the heads will be tilted in the clockwise sense with identical angles $\Phi$. Vertical movement for all of the heads in common is provided by a carriage 1133 which may be shifted in the vertical sense by a motor 1133b, e.g. by a leadscrew arrangement as described with respect to FIGS. 13 and 15. The carriage 1133 is provided with a horizontal arm 1133s from which a fork 1133t extends upwardly to carry the drive linkage. The fork receives the servomotor 1135 which acts upon the link 1145 connected by levers 1145a and 1145b of the bars 1143 and 1144 in a toggle joint, the latter being biased by a spring 1145c into the median position illustrated in the drawing. When motor 1135 is operated, therefore, the heads are tilted in common to one side or the other. The entire linkage is carried upon a shaft 1146 which is journaled between the arms of the fork 1133t for rotation about the axis $H_f$ so that the entire assembly may be tilted through the angle $\theta$ in the clockwise or counterclockwise sense as shown in FIG. 16B. In this embodiment as well as in that of FIGS. 15 and 15A, the servocontrol of the position of the sensor suffices to position the tool.

Figure 17:
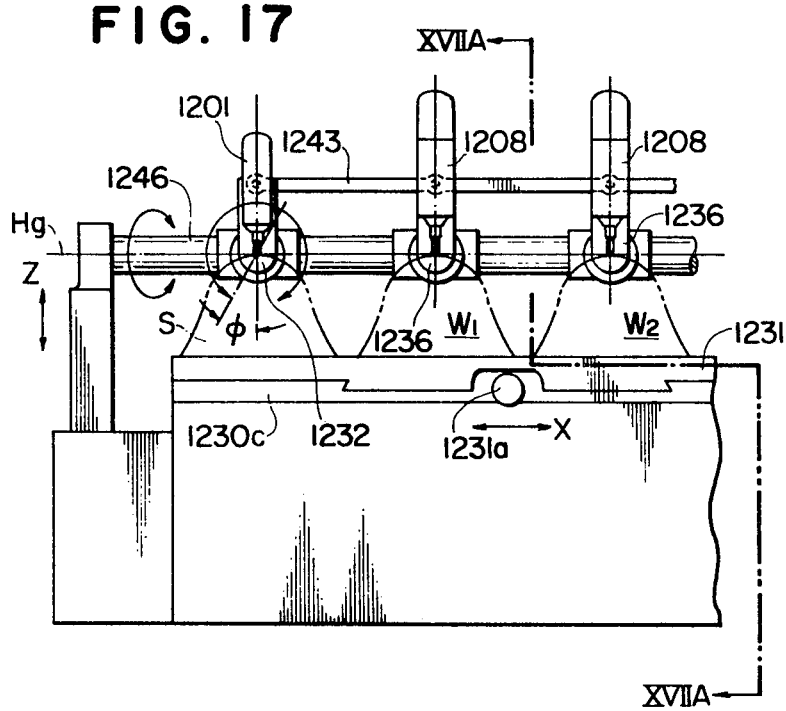
FIG. 17 is a front-elevational view, illustrating a modification of the head and coupling structure.
Figure 17A:
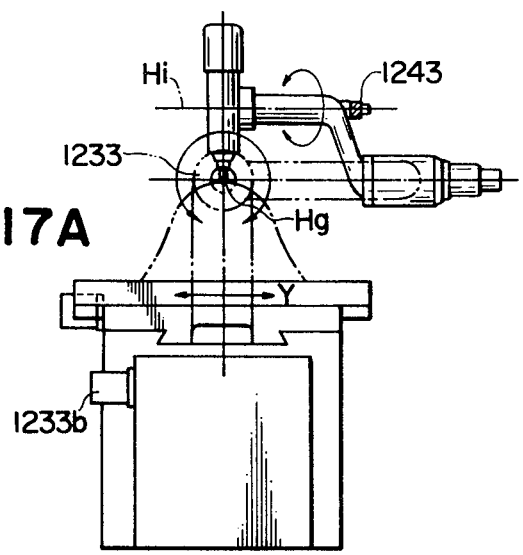
FIG. 17A is a view taken along the line XVIIA — XVIIA of FIG. 17.

In the arrangement of FIGS. 17 and 17A, the sensor head 1201 is mounted upon an arm 1232 rotatably received in the bar 1246 and driven by its servomotor as already described. The sensor head 1301 is, moreover, connected by a link 1243 to the heads 1208 of a number of machining stations, each of which is carried by its arm 1236. Hence angular displacement of the sensor about the axis of its bar 1232 in the clockwise or counterclockwise sense to establish the tilt angle $\Phi$ will result in a corresponding tilt of the machining heads.

Figure 18:
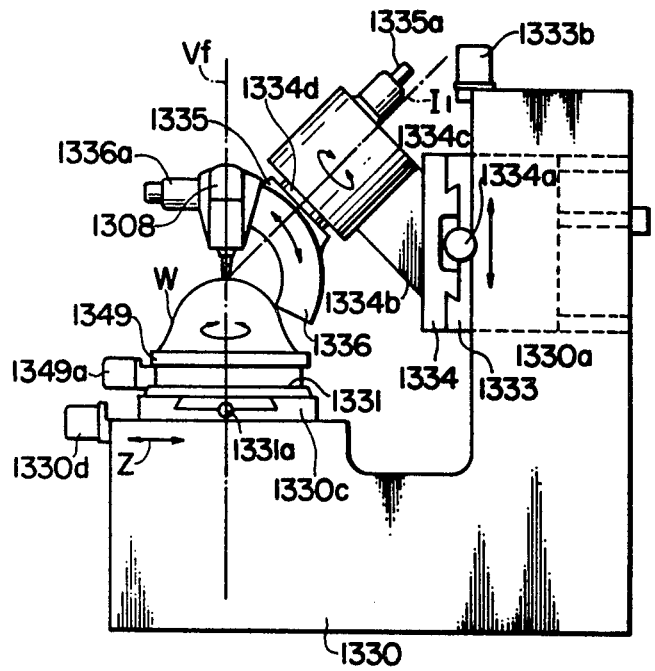
FIG. 18 is a side-elevational view of a multiple-movement head according to the present invention, in a machine in which the workpiece or model may rotate.

The bar 1246 is, moreover, journaled for rotation about the horizontal axis $H_q$ in the uprights 1233 at each end of the machine, the latter being vertically displaceable on respective carriages which may be driven by the motor 1233b. The uprights 1233 thus provide the vertical displacement Z. As in the embodiments already described, the model S and the workpiece $W_1$, $W_2$ etc. are carried on a platform 1231 shiftable in the Y direction by a servomotor 1231a while the underlying table 1230c is shiftable in the direction of arrow X via another servomotor not shown. The individual heads may, however, be rotatable about respective axes $H_i$ as shown in FIG. 7A, if desired, in which case a further link will couple the heads together apart from the link 1243 connecting the respective arms at swivels or pivots (e.g. ball joints). Each of the head arrangements of FIG. 16A, 16B, 17 and 17A may be substituted for those of FIGS. 13 – 15 and vice versa where mechanically linked copying is desired. Furthermore, the links of FIGS. 15 and 17A can be discarded if independent but electronically linked copying is required in accordance with the principles described in FIGS. 10 – 14. In FIGS. 18 – 18E, I shown a number of variations for mounting the tool head according to the present invention. For example, in FIG. 18, the pedestal 1330 carries a table 1330c which is displaceable in the direction of arrow Z by the servomotor 1330d. The table 1330c, in turn, carries the horizontally shiftable platform 1331 which can be displaceable in the direction of arrow X via the servomotor 1331a. In this system, however, the platform 1331 carries a turntable 1349 driven by motor 1349a so that the workpiece W may be rotated about the vertical axis $V_f$. The upright 1330a of the support carries the slide 1333 which is shiftable in the vertical direction by a motor 1333b and an appropriate leadscrew arrangement. The horizontal cross slide is represented at 1334 and is driven by the motor 1334a. An upwardly inclined arm 1334b carries a bearing assembly 1334c within which the shaft 1334d of a further turntable arrangement 1335 is rotatably received. The turntable 1335 can be driven about the inclined axis $I_1$ which intersects the vertical axis $V_f$ at the machining site. The carriage, which is rotated by the servomotor 1335a is formed with an arcuate rack 1336 whereby the machining head 1308 may be tilted via a servomotor 1336a. In other words, two degrees of angular rotation in mutually perpendicular planes are provided in this head as well. The system of FIG. 18B differs from that of FIG. 18 in that the slide 1434 carries a horizontal arm 1434b which is rotatable by a servomotor 1434a about the axis $H_q$. The arm 1436, rising from arm 1434b is rotatable by a servomotor 1436a to tilt the cutting head 1408 through the angle $\theta$ about its axis $H_k$. The workpiece W is rotatable about the vertical axis $V_q$ on the turntable 1449.

Figure 18A:
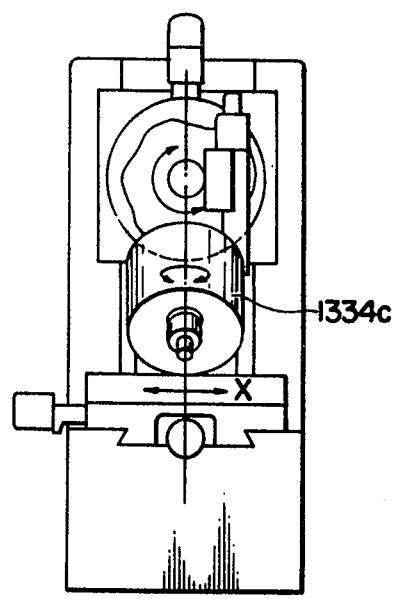
FIG. 18A is a front-elevational view of the machine of FIG. 18.
Figure 18B:
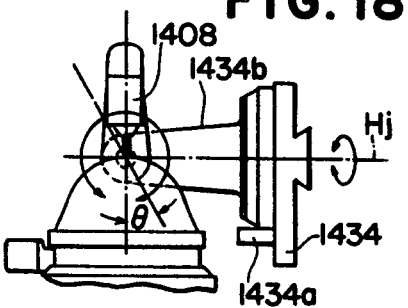
FIG. 18B is a side-elevational view of another machining head adapted to be used in the machine of FIG. 18.
Figure 18C:
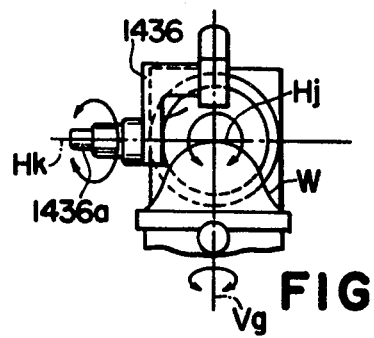
FIG. 18C is a front-elevational view of the latter head.

FIGS. 18D and 18E illustrate another embodiment of the present invention in which features of FIGS. 18 and 18A are used in common with some features of FIGS. 18B and 18C. In the embodiment of FIGS. 18D and 18E, the workpiece W is mounted upon a turntable 1549 which may be driven by a motor 1549a, the turntable 1549 being provided upon a longitudinal-feed platform and a corssfeed table in the manner described in the previous Figures, this X – Y assembly being represented at 1531. The arm 1534b is here shown to be journaled in a bearing 1535a for rotation about the inclined axis $I_2$ by a motor 1535a'. The arm 1543b is moreover, offset as shown in FIG. 18e and carries a crank-shaped arm 1536 which is rotatable by the servomotor 1536a and carries the head 1508. To permit vertical movement, the bearing sleeve 1535a is mounted upon a vertically displaceable carriage 1533 which, in turn, is supported by a horizontally displaceable carriage 1534. While the systems of FIGS. 18 – 18E may have the respective servomotors driven by electronic impulses, e.g. as generated by the circuits of FIGS. 7 – 9, they may also be mechanically coupled to the respective sensor or ganged along a workpiece support table as described in connection with FIGS. 17 and 17A.

FIG. 19 illustrated another modification of the tool or electrode support arrangement according to the present invention. In this case, the head 1608 is mounted upon a shaft 1636 which is rotatable about an axis $I_3$ by a servomotor 1636a or a link connecting a number of such assemblies together (see FIGS. 15, 15A and 15B). The bearing 1635a within which the shaft 1336 is journaled, is cantilevered from a crank-shaped arm 1635 mounted in a vertically displaceable post 1633 and is swingable about the axis $H_m$ by a servomotor 1635b. In addition, the apparatus comprises a compound table 1631 which can be driven in the X and Y directions by servomotors 1631a and 1630d. Of course, the head of FIG. 19 has the same motions and is operable in the same manner as the systems illustrated in FIGS. 18 – 18E.

Figure 20:
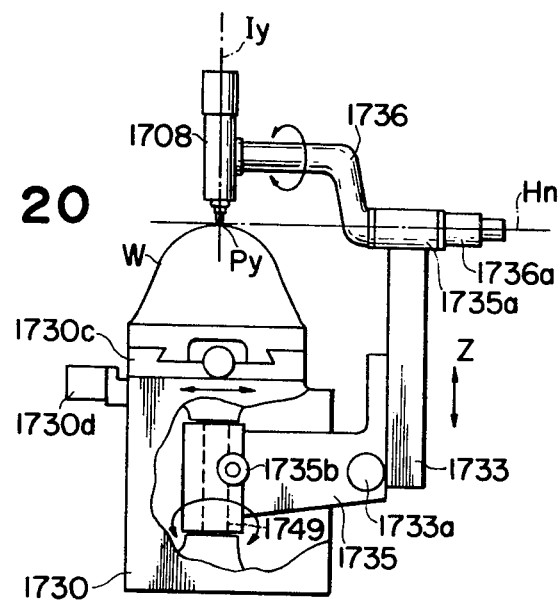
FIG. 20 is a side-elevational view of another apparatus for practicing the method of the present invention partly broken away.
Figure 20A:
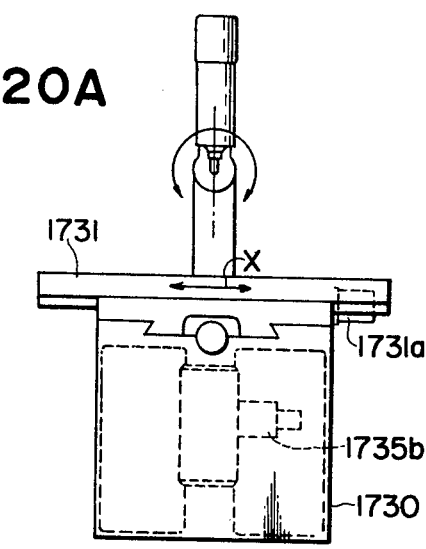
FIG. 20A is a front-elevational view of this latter machine.

FIGS. 20 and 20A illustrate yet another system for providing two degrees of angularly rotational freedom for the motor-containing tool head 1708 which is juxtaposed with the workpiece W. In this case, the tool head 1708 is cantilevered at the end of a crank-shaped arm 1736 whose axis of rotation $H_n$ intersects the tool axis $T_4$ at the machining point $P_4$ on the workpiece surface. The crank 1736 may be rotated by the servomotor 1736a and is journaled in a bearing 1735a of a vertically shiftable post 1733 movable in the direction Z by a servomotor 1733a. The servomotor 1733a and the vertically shiftable support 1733 are carried by the swingable arm 1735 which is rotatable about the workpiece axis on a shift 1749 by a servomotor 1735b. The arm 1735 is swingable about a vertical axis and is mounted in the support 1730 below the worktable. The latter is at least composed of a table 1730c shiftable by the servomotor 1730d in the Y-direction and carries a platform 1731 which can be displaced in the X-direction by the servomotor 1731a. Here again, the tool is capable of two degrees of angular displacement and linear movement along the Z axis.

As noted earlier, an important aspect of the present invention is the use of the system for the finishing of a workpiece with predetermined contours. An apparatus for such purpose has been illustrated in FIGS. 21 and 21A. In FIG. 21, for example, there is provided a housing 50 which is connected to an exhaust pump via a duct 51 from which the high-pressure fluid and particles or gases are evacuated. The "tool" in this case is a nozzle 58 mounted upon a support 57 with means, e.g. a servomechanism or a manual control 56 for adjusting the spacing between the nozzle 58 and the workpiece W which is here diagrammatically shown to be an electrode for EDM or ECM machining. The nozzle is preferably oriented perpendicular to the surface which is to be finished and for that purpose we may use any of the systems described heretofore in FIGS. 1 – 20. A simplified head mount and sensor arrangement has been illustrated here to emphasize the significant differences between the copy finishing apparatus and those using other mechanical material-removing techniques. The housing 50 is covered by a removable transparent door 50a and is provided with feed through insulators 50b and 50c through which wires 55 lead to the workpiece W and the nozzle 58 forms an electrochemical machining source 54. The latter may have the circuit configuration of any of the ECM power supplies illustrated and described in the aforementioned patents and apparatus dealing with electrochemical machining. A pump 53, driven by a motor 52 is provided to force electrolyte at high pressures through a flexible hose 59 into the nozzle 58 which is also supplied by an airstream via a tube 60 from an appropriate compressor. The abrasive particles may be metered into the airstream from a hopper 61 via a metering valve 62 or into the liquid line from a hopper 63 and a metering valve 64. In the embodiment of FIG. 21, the pattern or model S is mounted upon a table 70 which may be provided with X and Y coordinates of displacement as previously described. The sensor or feeler 69 is based downwardly to contact the surface of the model by a rack and pinion drive represented generally at 68 and forming a servomotor which may be operated by the circuits of FIGS. 7 or 7A. In this case, the nozzle 58 is coupled to the feeler 69 by the bar 67 for joint movement with the feeler although independent servomotors can be provided for the nozzle as described in connection with FIGS. 10 – 20. The traverse of the feeler 69 is accomplished by a pair of rails 66 which include a rack engaged by the pinion of a traverse servomotor 65. Motor 65 enables movement of the feeler and nozzle in the X-direction. Movement in the Y-direction is provided by a pair of rails 71 extending perpendicular to the plane of the paper but cooperating with the servomotor 72 to displace the feeler and nozzle in this direction as well.

A metering pump 73, driven by a motor 74 withdraws fluid from the cage basin 75 formed below the workpiece W and feeds it to the pump 53. The operation of the system of FIG. 21 will be more apparent from the specific Example set forth below.

A metering pump 73, driven by the motor 74 withdraws fluid from the cage basin 75 formed below the workpiece W and feeds it to the pump 53. The operation of the system of FIG. 21 will be more apparent from the specific Example set forth below.

In FIG. 21A, I show a modification of the system of FIG. 21 wherein the workpiece housing 150 is mounted upon the platform 131 which is shiftable in the X-direction by a leadscrew arrangement driven by the servomotor 131a. The pattern or model S and the workpiece W are thus carried upon the same table and, indeed, a number of nozzle heads and workpieces may be ganged as described in connection with FIGS. 17 and 17A.

The base 130 of the apparatus is provided with a stationary leadscrew 133a (see FIGS. 13 and 14) upon which a carriage 133 is vertically displaceable (Z-direction) by a servomotor 133b. The carriage 133 supports an arcuate rack 138 whose cross bar 138e is formed with bearings for respective crankshaped arms 136 and 132 respectively carrying a feeler 101 and the nozzle 108. As will be apparent from FIGS. 15, 15A and 15B, the arms 136, 132 are linked by a bar 142 and the usual swivel mechanism. The tool nozzle and sensor are thus capable of the same types of movement described in connection with FIGS. 13, 14, 15 and 15A.

The platform 131 is carried by a table 130c displaceable in a horizontal direction perpendicular to the direction of displacement of platform 131 by the servomotor 130d. The feeler or sensor 101 is here provided with the structure illustrated in FIG. 1 or 3 and with the circuits of FIGS. 7 – 9 to maintain orthogonality between the nozzle 108 and the workpiece.

A drain from housing 150 is shown at 175 to carry the liquid to the first-stage pump 173 which is driven by the motor 174 and feeds the high-pressure pump 153. The latter is driven by its motor 152 to supply the liquid to the nozzle via line 159. Air is supplied via line 160 and hopper arrangements such as are shown at 61 – 64 of FIG. 21 may be used to add particles to the system. The angular displacement of the rack 138 is provided by the servomotor 138d. The housing 150 has a suction outlet 151 for exhausting fumes, solid particles and droplets from the system.

Figure 22:
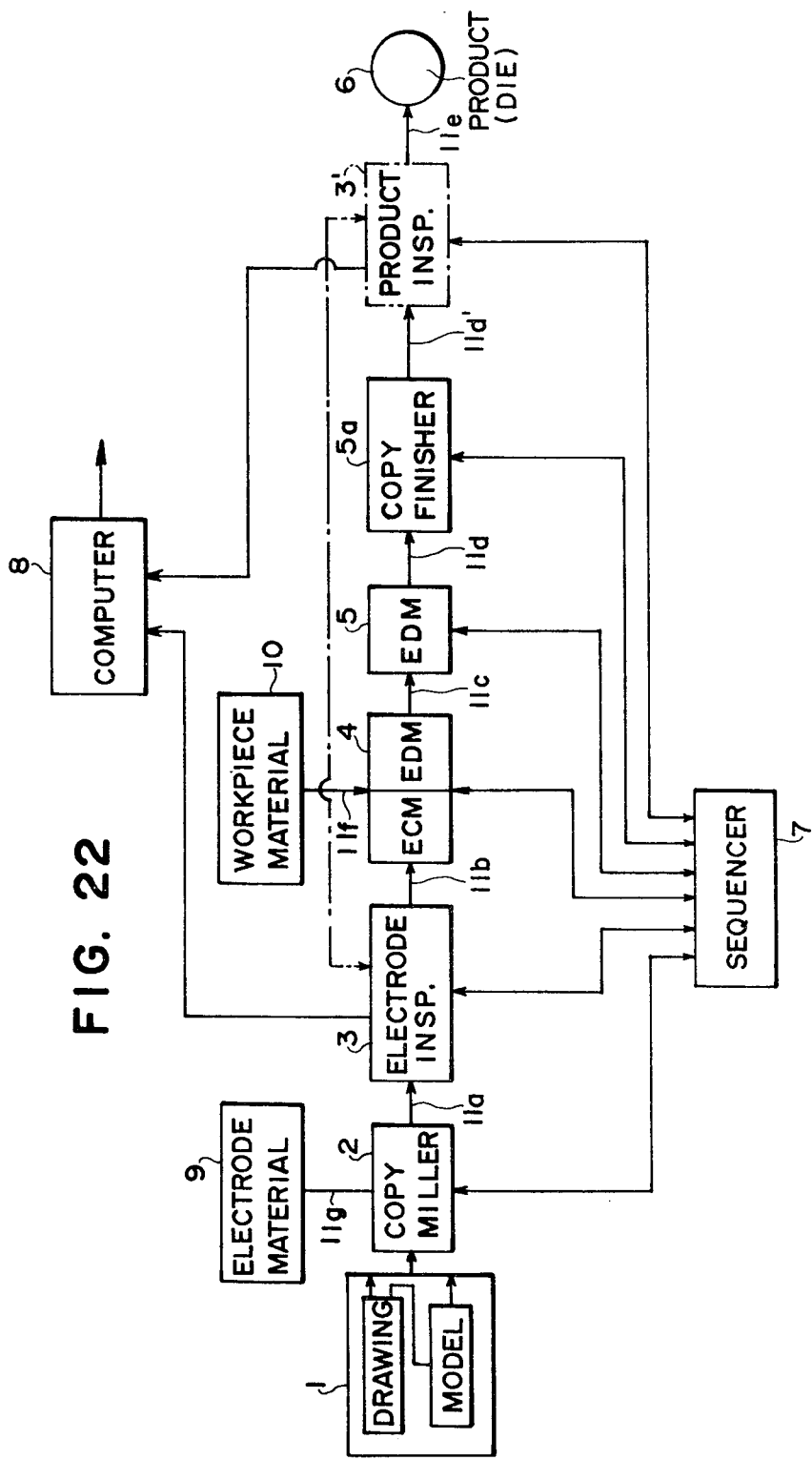
FIG. 22 is a block diagram illustrating various principles of the present invention.

In FIG. 22, I have shown a system for producing copies, especially a die or dies using the principles described above. In the first stage 1, a drawing of the desired product is produced in the usual manner and a negative model thereof may be formed from any convenient material, e.g. wood, plaster or other substance having little utility as an electrode material. The model is then mounted on a copy miller 2 of the type described in connection with FIGS. 1 – 20 to which is supplied a block of the electrode material, e.g. graphite, as a workpiece. At this stage, the electrode block conveniently is first roughly shaped by using a suitable cutting edge and the miller to copy the model in a conventional three-dimensional manner and then finish-shaped with a finish tool by using the tool axis always oriented normal to the surface as noted previously so that the resulting surface is practically free from any pick-feed marks which may otherwise be conventionally only eliminated by time-consuming and laborious hand-finishing. When the model has been reproduced in the electrode material, the electrode is automatically (under the control of sequencer 7) advanced by the conveyor 11a to the electrode inspection station 3 in which the electrode and model are compared and the dimensions delivered to the computer 8 which may reject the electrode or permit continuation of the sequence. The rejected electrode may be hand-finished where possible and data of machining parameters which resulted in the rejected electrode is then advantageously used to correct the machining parameters. The contours of the model are of course then stored in the computer for subsequent use. The satisfactory electrode is automatically stepped at 11b to, for example, a rough electrical shaping apparatus represented diagrammatically at 4 and of the ECM or EDM type. Such apparatus has been described in the patents and applications mentioned earlier. A further electrical machining stage 5 of the EDM finishing type may receive the workpiece which is delivered to stage 4 as represented by the block 10 and may be steel or the like, the conveyor 11c being provided for advancing the workpiece. Prior to electrical machining, the workpiece may be mechanically machined roughly and then hardened. After finish machining the stage 5, the product is automatically stepped at 11d to the copy-finishing or fluid-honing apparatus 5a at which a high-quality surface finish is provided under the control of the original model or computer-stored information instead of hand-finishing as in the prior art, whereupon the workpiece is delivered at 11d' to the product inspection station 3'. Here the dimensions and contours of the product are compared with the computer-stored information at 8 and, if desired, the model is recycled as represented at 11f or an adjustment is made in the information for controlling the system in a feedback loop. The product is automatically advanced from the system by the conveyor 11e and is recovered at 6 as a die, complementary to the original model and electrode.

Electrical machining stages 4 and 5 may require a number of electrodes, namely, rough machining electrode, finish machining electrode, medium machining electrode etc. and it is apparent that such electrodes either of identical or different dimensions may be prepared readily with the copy miller 2 from a common model or drawing, or separate similar models or drawings and then inspected at the stage 3.

Electrical machining steps 4 and 5 may conveniently be carried out with a common apparatus, e.g. an EDM apparatus, especially of the type affording versatile machining performance capabilities and which preferably is provided with an automatic parameter switchover system and an automatic electrode exchanger arrangement such that once a workpiece block has been received it may accomplish several steps of machining automatically or essentially without an operator's intervention and outputs an adequately electrically machined workpiece.

When the electrode required for electrically shaping a die at stages 4 and 5 includes a concave surface which does not permit satisfactory shaping by an appropriate cutter or cutters with the copy miller according to the invention at the stage 2, the model is divided into parts designed suitably as individually constituted by essentially convex surface and each of the electrode parts is prepared from the corresponding one of the divided models using the miller in the same manner as described previously. The copy-shaped electrode parts may then be installed in a magazine or storage of an automatic tool exchange unit of the EDM or ECM apparatus as noted above and used in the latter in a suitable sequence to progressively machine the workpiece to a required shape which is complementary to the model which the divided electrodes collectively form.

SPECIFIC EXAMPLE

A workpiece consisting of 0.55% carbon steel (S55C) is machined by an EDM graphite electrode using a kerosine as machining liquid. The EDM on-time was 240 microseconds and the off-time was 12 microseconds. The peak machining current was 40 amperes. The surface roughness of the product as 11 microns $H_{max}$. The roughness dimensions here used indicate the maximum height of portions of the surface adjacent low points, in terms of microns. A similar body, shaped by hand, has a roughness of 25 microns $H_{max}$ and requires 16 hours of manual effort to reduce the roughness to three microns $H_{max}$.

After machining to the roughness of 11 microns $H_{max}$ by EDM, as mentioned earlier, the surface of the body is treated by sand-blasting using air pressure at 5.5 kg/cm$^2$ and silicon carbide particles of 180 mesh. The surface roughness was thereby reduced to, at best, 4 to 8 microns $H_{max}$ using the apparatus illustrated in FIGS. 21 or 21A, with a 3 mm — diameter nozzle spaced at several millimeters from the workpiece and perpendicular thereto, with water containing 15% sodium nitrate and at a pressure of 35 kg/cm$^2$, the surface roughness was reduced to 3.5 microns. With a system using ECM current of 2.2 amperes at a potential of 40 volts, with silicon carbide and air, the surface roughness could be lowered to 1.5 microns $H_{max}$. With the nozzle tilted from a perpendicular to the surface by 2°, the roughness was increased by three times.

I claim:

1. An apparatus for shaping a workpiece comprising:
    a sensor adapted to scan a model and generating a plurality of signals defining a plane tangent to the surface of said model and the direction of curvature of said surface at a sensed point;
    a workpiece support adapted to receive said workpiece;
    a tool having an axis and juxtaposed with said workpiece;
    a tool support carrying said tool; and
    means connected with at least one of said supports and operatively connected with said sensor for relatively displacing said workpiece and said tool with respect to a multiplicity of axes for maintaining the tool axis normal to a contour generated in said workpiece by said tool, said sensor comprising a plurality of fingers biased in the direction of said model, respective mechanical/electrical transducers for converting the positions of each of said fingers into an electrical analog signal representing said position, said means connected to at least one of said supports including respective servomotors responsive to said signals.

2. The apparatus defined in claim 1, further comprising analog/digital converter means between said transducers and the respective servomotors for stepping the latter in accordance with the respective analog signals.

3. The apparatus defined in claim 2 wherein said tool support comprises a member carrying said tool and angularly displaceable about an axis by one of said servomotors, said apparatus further comprising a respective trigonometric-transfer-function network between at least two of said transducers and said one of said servomotors for operating same in response to an angular position represented by the respective fingers.

4. The apparatus defined in claim 8, further comprising a plate adapted to bear tangentially upon said model and engaging said fingers.

5. The apparatus defined in claim 1 wherein said fingers surround a central sensor member, said central sensor member producing an output signal representing the direction of curvature of the model surface engaged by said fingers.

6. The apparatus defined in claim 1, further comprising means for pneumatically biasing each of said fingers in the direction of said model.

7. The apparatus defined in claim 1 wherein said tool support comprises a carriage shiftable linearly in one direction relative to said workpiece, a first arm journaled on said carriage for rotation about an axis perpendicular to the direction of displacement thereof, and a second arm journaled on said first arm for rotation about an axis perpendicular to the axis of rotation of said first arm, said tool being mounted on said second arm with its axis substantially coplanar with the axis of rotation of said second arm.

8. The apparatus defined in claim 7, further comprising rigid link means pivotally connected beween said sensor and said tool support for joint displacement thereof.

9. The apparatus defined in claim 1 wherein said workpiece support comprises a table carrying both said model and said workpiece, and means for displacing said model in two mutually perpendicular linear directions.

10. The apparatus defined in claim 1, further comprising drive means for rotating said workpiece about the axis of said tool.

11. The apparatus defined in claim 1 wherein said tool is a milling cutter.

12. The apparatus defined in claim 1 wherein said tool is a nozzle for directing a fluid-honing jet against said workpiece.

13. The apparatus defined in claim 12, further comprising a source of electrochemical-machining current connected between said workpiece and said nozzle.

14. The apparatus defined in claim 13, further comprising means for forcing compressed air through said nozzle.

15. Apparatus as defined in claim 7 wherein the axis of rotation of said first arm and the axis of rotation of said second arm are arranged to intersect said tool at the machining region on said workpiece.

* * * * *